(12) United States Patent
Suzuki

(10) Patent No.: US 7,502,125 B2
(45) Date of Patent: Mar. 10, 2009

(54) MEASURING TECHNOLOGY AND COMPUTER NUMERICAL CONTROL TECHNOLOGY

(75) Inventor: Tatsuhiko Suzuki, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 877 days.

(21) Appl. No.: 10/923,856

(22) Filed: Aug. 24, 2004

(65) Prior Publication Data

US 2005/0046873 A1 Mar. 3, 2005

(30) Foreign Application Priority Data

Aug. 28, 2003 (JP) ............................. 2003-304066
Jun. 30, 2004 (JP) ............................. 2004-194470

(51) Int. Cl.
*G01B 11/24* (2006.01)

(52) U.S. Cl. ....................... 356/604; 382/154; 382/286; 356/603

(58) Field of Classification Search ....................... None
See application file for complete search history.

(56) References Cited

U.S. PATENT DOCUMENTS 6,075,605 A * 6/2000 Futamura et al. ............. 356/608
6,788,210 B1 * 9/2004 Huang et al. ................. 382/286

FOREIGN PATENT DOCUMENTS

| JP | 03-192474 | 8/1991 |
| JP | 2003-065738 | 3/2003 |
| WO | WO 01/20539 A1 * | 3/2001 |

OTHER PUBLICATIONS

H. Lu et al., "Automatic Measurement of 3-D Object Shapes Based on Computer-generated Reference Surfaces", Bulletin of the Japan Society of Precision Engineering, vol. 21, No. 4, pp. 251-257, (Dec. 1987).

(Continued)

*Primary Examiner*—Gregory J Toatley, Jr.
*Assistant Examiner*—Juan D Valentin
(74) *Attorney, Agent, or Firm*—Staas & Halsey LLP

(57) ABSTRACT

A measuring apparatus of this invention comprises: a projector; a camera; a generator that generates, from a photographed image of a fringe pattern projected by the projector at a time of calibration onto each of surfaces, first tuples, each including coordinates of a point on a light receiving plane (LRP) of the camera, light intensity of the point and the height of the surface; a converter that converts the light intensity to a phase angle of the projected fringe pattern (PFP), and generates second tuples, each including the coordinates of the point on the LRP, the phase angle and the height of the surface; a hypersurface generator that generates data representing a tensor product type composite hypersurface (TPTCH) from data of the second tuples; an extractor that extracts data of third tuples, each including coordinates of a point on the LRP and light intensity from a photographed image of a fringe pattern projected by the projector at a time of measurement onto an object to be measured; a second converter that converts the light intensity to a phase angle of the PFP to generate data of fourth tuples, each including the coordinates of the point on the LRP and the phase angle; and an interpolator that carries out interpolation by using the data representing the TPTCH to generate height data corresponding to the data of the fourth tuple.

30 Claims, 22 Drawing Sheets

OTHER PUBLICATIONS

Walyi Liu et al., "Color-coded projection grating method for shape measurement with a single exposure", Applied Optics, vol. 39, No. 20, Jul. 10, 2000, pp. 3504-3508.

Ken Yamatani et al., "Three-Dimensional Shape Measurement by Liquid Crystal Grating Pattern Projection", Bulletin Japan Society of Precision Engineering, vol. 67, No. 5 (2001), pp. 786-790.

Mitsuo Takeda et al., "Fourier transform profilometry for the automatic measurement of 3-D object shapes", Dec. 15, 1983, vol. 22, No. 24, Applied Optics, pp. 3977-3982.

Gerald E. Farin, "Curves and Surfaces for Computer Aided Geometric Design : A Practical Guide", Academic Press Inc.: ISBN: 0122490517, The Bernstein Form of a Bezier Curve, pp. 37-49 and Tensor Product Bezier Surface, pp. 249-269 (1990).

Fujio Yamaguchi, Shape Processing Engineering (II), published by The Nikkan Kogyo Shimbun Ltd., pp. 69-77 (Dec. 28, 1982).

Byoung K. Choi et al., "Sculptured Surface Machining", Kluwer Academic Publishers, 1998, pp. 37-39.

\* cited by examiner

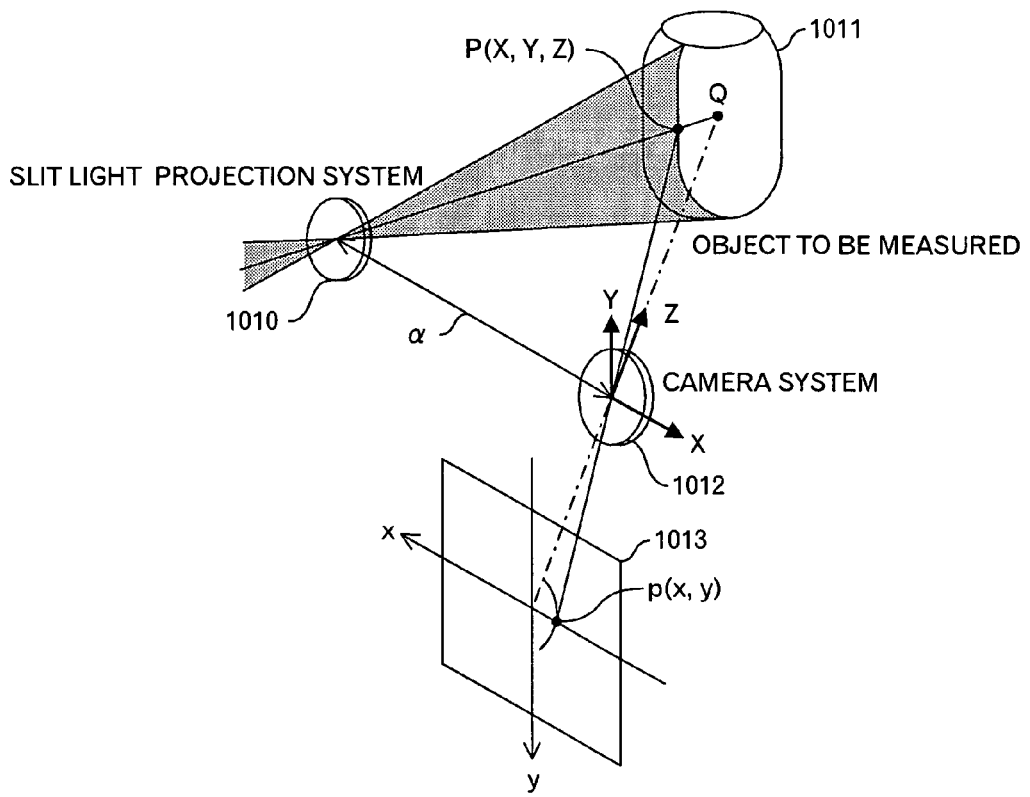
PRIOR ART  FIG.1
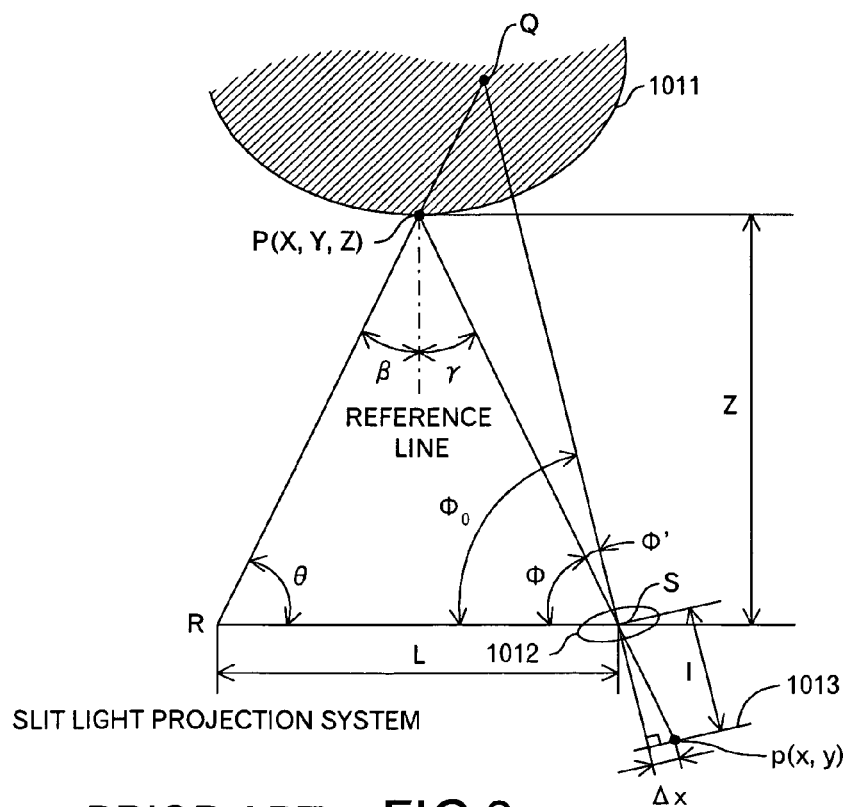
PRIOR ART  FIG.2

| i | j | k | x COORDINATE | y COORDINATE | z COORDINATE | LIGHT INTENSITY I | PHASE ANGLE |
|---|---|---|---|---|---|---|---|
| 0 | 0 | 0 | 0 | 0 | 50 | 123 | 0 |
| 0 | 1 | 0 | 1 | 0 | 50 | 125 | 5 |
| 0 | 0 | 1 | 0 | 1 | 50 | 123 | 0 |
| 0 | 1 | 1 | 1 | 1 | 50 | 125 | 5 |
| 0 | 2 | 0 | ⋮ | ⋮ | ⋮ | ⋮ | ⋮ |
| ⋮ | ⋮ | ⋮ | | | | | |
| | | | | | | | |

| No. | x COORDINATE | y COORDINATE | Z COORDINATE | PHASE ANGLE |
|---|---|---|---|---|
| 1 | 0 | 0 | 50 | 0 |
| 2 | 0.3 | 0 | 50 | 5 |
| 3 | 0.6 | 0 | 50 | 5 |
| 4 | 1 | 0 | 50 | 5 |
| 5 | ⋮ | ⋮ | ⋮ | ⋮ |
| ⋮ | | | | |
| | | | | |

| No. | x COORDINATE | y COORDINATE | LIGHT INTENSITY I | PHASE ANGLE | Z COORDINATE |
|---|---|---|---|---|---|
| 1 | 0 | 0 | 50 | 0 | 50 |
| 2 | 1 | 0 | 70 | 5 | 50 |
| 3 | 0 | 1 | 72 | 5 | 50 |
| 4 | 1 | 1 | 90 | 10 | 60 |
| 5 | ⋮ | ⋮ | ⋮ | ⋮ | ⋮ |
| ⋮ | | | | | |
| | | | | | |

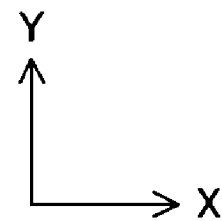
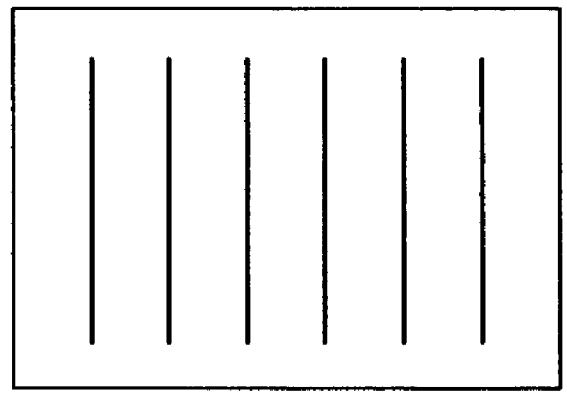
FIG.16A
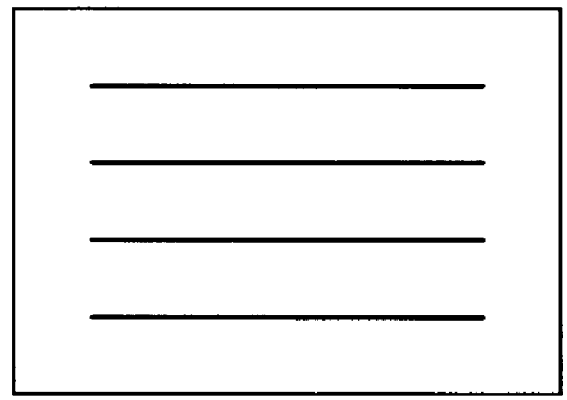
FIG.16B
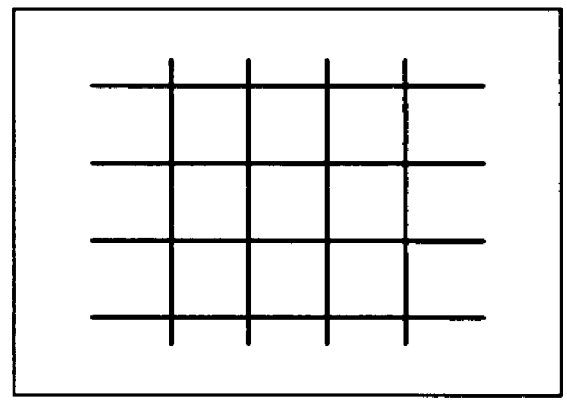
FIG.16C

FIG.17

| i | j | k | x COORDINATE | y COORDINATE | X COORDINATE | Y COORDINATE | Z COORDINATE | LIGHT INTENSITY I |
|---|---|---|---|---|---|---|---|---|
| 0 | 0 | 0 | 2 | 0 | 15 | - | 50 | 123 |
| 0 | 1 | 0 | 4 | 0 | 30 | - | 50 | 125 |
| 0 | 0 | 1 | 2 | 1 | 15 | - | 50 | 123 |
| 0 | 1 | 1 | 4 | 1 | 30 | - | 50 | 125 |
| ... | ... | ... | ... | ... | ... | ... | ... | ... |

1501 1502 1503 1504 1505 1506 1507 1508 1509

| No. | x COORDINATE | y COORDINATE | LIGHT INTENSITY I | PHASE ANGLE | Z COORDINATE | X COORDINATE | Y COORDINATE |
|---|---|---|---|---|---|---|---|
| 1 | 0 | 0 | 50 | 0 | 50 | 2 | 3 |
| 2 | 1 | 0 | 70 | 5 | 50 | 4 | 5 |
| 3 | 0 | 1 | 72 | 5 | 50 | 6 | 7 |
| 4 | 1 | 1 | 90 | 10 | 60 | 8 | 9 |
| 5 | ⋮ | ⋮ | ⋮ | ⋮ | ⋮ | ⋮ | ⋮ |
| ⋮ | | | | | | | |
| | | | | | | | |

FIG.20

| 2601 | 2602 | 2603 | 2604 | 2605 |
|---|---|---|---|---|
| i | j | x COORDINATE | y COORDINATE | Z COORDINATE |
| 0 | 0 | 2 | 1 | 50 |
| 0 | 1 | 2 | 3 | 50 |
| 0 | 2 | 2 | 5 | 50 |
| 0 | 3 | 2 | 7 | 50 |
| 0 | 4 | ⋮ | ⋮ | ⋮ |
| ⋮ | ⋮ | | | |
| | | | | |

| 2701 | 2702 | 2703 | 2704 | 2705 | 2706 |
|---|---|---|---|---|---|
| No. | x COORDINATE | y COORDINATE | Z COORDINATE | X COORDINATE | Y COORDINATE |
| 1 | 0 | 0 | 50 | 2 | 3 |
| 2 | 0 | 2 | 50 | 4 | 5 |
| 3 | 0 | 4 | 50 | 6 | 7 |
| 4 | 0 | 7 | 60 | 8 | 9 |
| 5 | ⋮ | ⋮ | ⋮ | ⋮ | ⋮ |
| ⋮ | | | | | |
| | | | | | |

MEASURING TECHNOLOGY AND COMPUTER NUMERICAL CONTROL TECHNOLOGY

TECHNICAL FIELD OF THE INVENTION

The present invention relates to a technique to measure the three-dimensional shape of an object to be measured by projecting light to the object to be measured.

BACKGROUND OF THE INVENTION

The measurement of a three-dimensional shape has been used not only in an industrial field but also in social various fields such as medicine, biology, archaeology, and the examination and restoration of works of art. In the three-dimensional measurement, non-contact type optical measurement has been more desired than conventional contact type measurement. Region measurement in the optical measurement is broadly divided into a light section method of measuring a region by scanning the region with one linear slit light in a direction perpendicular to a direction of slit and a measurement method of measuring a region by a surface.

As for the light section method, although various modes have been developed, it is basically based on a principle shown in FIG. 1. That is, a measuring unit using the light section method includes a slit light projection system including a light source such as laser and a slit 1010 and a camera system including a lens 1012 and light receiving elements (light receiving plane thereof) 1013. That is, a slit light from the slit light projection system is projected to an object 1011 to be measured. In an example shown in FIG. 1, the slit light shown by hatch is projected to the object 1011 to be measured. The image of the slit light projected to the object 1011 to be measured is focused on the light receiving elements 1013 by use of the lens 1012 included in the camera system. For example, a point P (X, Y, Z) (where (X, Y, Z) are coordinate values in an actual coordinate system) on the object to be measured to which the slit light is projected is observed as p (x, y) (where (x, y) are coordinate values on the light receiving plane) on the light receiving elements (light receiving plane thereof) 1013. Here, the slit light projection system and the camera system of the measuring unit are moved at predetermined intervals in such a way that the measurement range of the object 1011 to be measured is scanned with the slit light, and the image of the slit light projected to the object 1011 to be measured is taken by the camera system every time both the systems are moved. Further, it is assumed that the intersection of a straight line (a single dot and dash line in FIG. 1) passing the center of the lens 1012 and perpendicular to the light receiving elements (light receiving plane thereof) 1013 and a plane of the slit light is a point Q and that the length of a line segment α connecting the center of the slit 1010 and the center of the lens 1012 of the slit light projection system is L.

Next, the positional relationship between the measuring unit and the object to be measured, which is shown in FIG. 1, will be described in detail by use of FIG. 2. Here, it is assumed that the center of the slit 1010 is a point R and that the center of the lens 1012 is a point S. At this time, an angle between a line segment RP and a line segment PS is β+γ and is divided into β and γ by a line (reference line) perpendicular to the line segment RS. Further, an angle between the line segment PR and a line segment RS is θ and an angle between the line segment PS and the line segment SR is Φ. Still further, an angle between a line segment QS overlapping a main axis and the line segment SR is $\Phi_0$, and $\Phi_0 - \Phi = \Phi'$. Further, it is assumed that the distance between the point S and the light receiving plane 1013 of the light receiving elements is 1 and that the distance between the line segment RS and the point P is a length Z to be measured. With this, the following formula is established.

$$Z = \frac{\tan\theta \cdot \tan\Phi}{\tan\theta + \tan\Phi} \cdot L \qquad \text{[Mathematical formula 1]}$$

Here, the point P is observed at a point p which is deviated by Δx with respect to the main axis on the light receiving plane 1013 of the light receiving elements, so that $\Phi' = \tan^{-1}(\Delta x/1)$ and hence $\Phi(=\Phi_0+\Phi')$ can be calculated. Therefore, if the angles θ, $\Phi_0$, and Φ' and the lengths 1 and L are obtained, Z can be calculated according to the aforementioned mathematical formula. These parameters naturally include measurement errors.

In the light section method, a mechanical moving mechanism of the slit light projection system and the like is required, as described above, so that this causes a bottleneck and presents a problem that time required for measurement can not be shortened to decrease efficiency. Hence, there is a problem in applying the light section method to a field where the time required for measurement needs to be shortened. Further, the light section method presents a problem of taking a great deal of time and labor for maintenance and adjustment because it has the mechanical moving mechanism.

On the other hand, a typical method of measuring a region by a surface includes a moiré method of acquiring contour lines by moiré fringes and a fringe pattern projection method of observing a fringe pattern made by projecting a stripe-shaped grating pattern onto an object. The latter method has been expected at present, in particular, from the viewpoint of measurement accuracy and the cost of measuring unit.

The fringe pattern projection apparatus, as shown in FIG. 3, is usually divided into two systems: a projection system including a projection unit 1000, a projector lens 1002 and a grating 1001, and a camera system including a camera unit 1005 that takes the image of a deformed fringe pattern 1003 projected onto an object 1004 to be measured via a lens 1006. The projection unit 1000 projects a fringe made by a grating 1001 onto the object 1004 to be measured via the lens 1002. A fringe pattern produced by the projection is deformed by protrusions and depressions of the object 1004 to be measured. The camera unit 1005 takes the image of the deformed fringe pattern 1003 in a direction different from a direction of the projection, converts it to electric signals via light receiving elements such as CCDs (charge coupled devices), and stores the electric signals in a storage device. Then, by analyzing these, the three-dimensional shape of the object 1004 to be measured is measured. Here, each of the light receiving element outputs an electrical signal such as a voltage corresponding to light intensity at the point of the element. As for the grating 1001, in the past, it was fixedly formed on the surface of a glass plate or the like, but in recent times, a grating made by liquid crystal or the like has been brought into practical use, and a stripe-shaped grating realized in a liquid crystal device by a computer has been practically used.

Usually, a reference plane perpendicular to the optical axis of the projection unit 1000 is set, and on this reference plane, two axes of an axis Y in a direction of a fringe and an axis X perpendicular to the fringe are set. This is disclosed in detail in "Automatic Measurement of 3-D Object Shapes Based on Computer-generated Reference Surfaces" by H. Lu et al., Bull. Japan Soc. of Prec. Eng. Vol. 21, No. 4, p251 (1987). In this method, a fringe pattern is expressed as a wave of light intensity I with respect to positions on the axis X perpendicular to the fringe, and is analyzed by use of the phase $\Phi(=\Phi_2)$ of a wave in a case where the object 1004 to be measured is placed on the reference plane or by use of the difference $\Delta\Phi(=\Phi_2-\Phi_1)$ between the phase $\Phi_1$ of a wave on the reference plane and the phase $\Phi_2$ of the wave in a case where the object 1004 to be measured is placed on the reference plane. With this, the fringe pattern projection method is also alternatively called "a modulated fringe phase method". Here, it is because systematic errors caused in the measurement are eliminated by deduction to improve accuracy, that the difference $\Delta\Phi$ of the phase of the wave is used. In this method, a fringe wave (pair of bright fringe and dark fringe) number can be arbitrarily set if they are relative to each other. Incidentally, calculation is usually performed on the assumption that a phase angle is $2\pi$ for 1 wavelength of the fringe wave.

A detailed calculation formula is disclosed in the aforementioned paper and hence its detailed description will be omitted here. To calculate $\Delta\Phi$, $\Phi_1$ is calculated from the optical geometric positional relationship such as the distance between the grating 1001 and the lens 1002, the distance between the intersection of the optical axis of the camera unit 1005 and the optical axis of the projection unit 1000 and the lens 1002, fringe interval, and the angle between the optical axis of the camera unit 1005 and the optical axis of the projection unit 1000. These geometrical positions naturally include measurement errors.

In addition to this, a method of calculating measurement values or the like by use of other calculation formula is also disclosed in "Three-Dimensional Shape Measurement by Liquid Crystal Grating Pattern Projection" by Ken Yamatani et al., Bull. Japan Soc. of Prec. Eng. Vol. 67, No. 5, p. 786 (2001) and "Fourier Transform Profilometry for the Automatic Measurement of 3-D Object Shapes" by Mitsuo Takeda et al., Applied OPTICS. Vol. 22, No. 24, p. 3977 (1983). In these papers, calculation is carried out commonly by use of measurement results of optical geometric positions.

Here, $\Phi_2=2\pi\times$(fringe wave number)+(in-fringe phase angle) and $\Phi_2$ is calculated from measured values. In this manner, in the methods described above, in particular, the fringe wave number and the in-fringe phase angle need to be specified.

To acquire the in-fringe phase angle, scanning is performed along the X axis (see FIG. 3) in the direction perpendicular to the fringe, set on the reference plane. Not only in a sine wave fringe but also in a so-called Ronchi fringe in which fringe is binarized, the light intensity I of the fringe pattern is gradually changed along the X axis in the direction perpendicular to the fringe by optical diffraction phenomenon and discrete errors caused by light receiving elements in the vicinity of the boundaries of bright and dark fringes. This light intensity distribution is recognized as a wave, and the in-fringe phase angle from the base point of the sine wave as a starting point is calculated.

In order to calculate the in-fringe phase angle, it is known that assuming that light intensities when the fringe is shifted by $\pi/2$, $\pi$, $3\pi/2$ are $I_0$, $I_1$, $I_2$, and $I_3$ on the condition that the sine wave grating is used, the in-fringe phase angle at an arbitrary point x can be calculated by the following formula. This method is considered to be "a position fixing type in-fringe phase angle calculation method".

[Mathematical formula 2] (1)

$$\Phi(x) = \tan^{-1}\frac{I_3(x) - I_1(x)}{I_0(x) - I_2(x)}$$

In addition to this, there are a method in which a in-fringe phase angle is made 0 at a point of the central value of a segment from a valley to a peak and a method of detecting peaks of a valley and a peak. However, in these methods, the positions where the in-fringe phase angle are 0, $\pi/2$, $\pi$, and $3\pi/2$ are calculated by shifting the grating by $\pi/2$, $\pi$, $3\pi/2$. This is considered to be "a phase angle fixing type position calculation method". Even if either of the methods is used, the fringe number changes at a point where the in-fringe phase angle is 0, and one fringe wave is distinguished there.

As described above, in the fringe pattern projection method, if the fringe wave number is not determined, three-dimensional measurement cannot be performed. In a case where the fringe wave is continuous, the fringe wave number increases or decreases by one along the X axis, so that the phase difference $\Delta\Phi$ can be easily calculated. However, the fringe becomes discontinuous in some cases. In a case where the fringe becomes discontinuous, the continuity of the fringe wave number cannot be used, so that the phase difference cannot be easily calculated. Further, if the fringe wave number is recognized by mistake, measurement errors are caused.

To cope with this problem, as for a method of acquiring the fringe wave number automatically while dealing with the discontinuity of the fringe, many researches on a white and black fringe, as summarized in "Three-Dimensional Shape Measurement by Liquid Crystal Grating Pattern Projection" by Ken Yamatani et al., Japan Soc. of Prec. Eng. Vol. 67, No. 5, p. 786 (2001), have been conducted. In addition to this, a method of using a color fringe has been known. Because this method of acquiring the fringe wave number is not a main object of this application, the further detailed explanation is omitted.

Further, JP-A-2003-65738 discloses the following technology. That is, to perform a camera calibration, the image of a flat plate having markers whose X and Y coordinates are already known is taken several times at different positions in a Z direction. With this, camera parameters are calculated from positions of the markers, which are not on the same plane, on the images and positions of the markers in a world coordinate system. Next, in order to acquire a fringe plane equation, fringe spatial positions are actually measured. At this time, a fringe pattern is projected to a flat plate by a projection unit. The image of the flat plate is taken by a camera unit at least two times at different positions in the Z direction moving the flat plate. Then, as for the respective projected fringes, spatial coordinates are acquired for at least three points Pa, Pb, and Pc, which are included in the optical plane (plane intersecting an X-Y plane) of the fringes and are not on a straight line. For this purpose, arbitrary two points Qa, Qb on a straight image by one fringe are determined in an image farther from the camera unit. The pixel coordinate positions Qa (ua, va), Qb (ub, vb) of these points Qa, Qb are determined. Similarly, one arbitrary point Qc on a straight image by the same fringe is determined in an image closer to the camera unit. The pixel coordinate position Qc (uc, vc) of this point Qc is calculated. Then, positions Pa (xa, ya, z1), Pb (xb, yb, z1), and Pc (xc, yc, z2) of the respective points on the fringe in the world coordinate system are determined by use of the pixel coordinate positions of these points $Q_a$, $Q_b$, and $Q_c$, distances z1, z2, and the camera parameters. This processing is performed for all fringes of the fringe pattern. The determined positions (coordinate data) of the respective points are stored as fringe spatial positions in a storage device. Further, the respective fringe plane equations are determined on the basis of the fringe spatial positions and are stored in the storage device. Generally, the fringe plane equation is expressed by the following equation: ax+by+cz=d. As the data of the fringe plane equation, for example, parameters a, b, c, d of this equation are stored. Incidentally, while the coordinate positions of three points are determined for one fringe in the above description, it is also recommended that the coordinate positions of four points or more be determined by making the Z coordinate position of the flat plate or the position on an image dense. In this case, if these points are not coplanar, an approximate fringe plane equation is determined. Using this method, a fringe plane equation with more accuracy can be acquired.

In the technology like this, only acquisition of the fringe plane equations for the respective fringes is a purpose, so that the relationship between the fringes is not grasped and hence the whole space cannot be expressed correctly. Hence, correct measured values cannot be obtained in some case. In addition, while the calculation results of the camera parameters are used for calculating the fringe plane equations, what data the camera parameters are and the calculation method of the camera parameters are not explicitly described. Hence, in a case where the camera parameters are not calculated with sufficient accuracy, the accuracy of the fringe plane equation is also decreased.

As described above, in the conventional light section method, the measurement errors are included in the parameters necessary for the calculation and restrict measurement accuracy.

Further, in the fringe pattern projection method realized by the aforementioned conventional technology, "the fixed-position type in-fringe phase angle calculation method" is predicated on the sine wave fringe and the measurement accuracy depends on the degree of its realization, so researches on the improvement of the degree of the realization have been conducted. However, because the liquid crystal is discrete, it is clear that the degree of the realization of the sine wave fringe has a limitation and hence the measurement accuracy is restricted by this. Further, while efforts have been made to improve the accuracy of the coefficients of the equation in the conventional method, it is difficult to obtain values with high accuracy for all points in the volume to be measured. Still further, in the case of "the phase angle fixing type position calculation method", different points are referenced, but errors are caused by the difference in the brightness on the background of the points referenced, thereby the accuracy is restricted.

In addition, in the fringe pattern projection method, the formula for calculating $\Delta\Phi$ (and the like shown in the aforementioned papers includes calibration parameters, and these calibration parameters include errors and hence put limitations on accuracy. For example, in a case where the calibration parameter includes 0.2% error, if the error is caused by nonlinearity, an error of 0.4 mm is caused, when an object of 200 mm in width is measured.

Furthermore, there is also presented a problem that in a case where light reception data has system errors, these formulas cannot guarantee the industrially important horizontality of the measured value on the horizontal plane. The formulas in the aforementioned papers guarantee the horizontality only for the reference plane if accidental errors are not caused but do not guarantee the horizontality for the horizontal planes of the other heights.

Further, each of a fringe pattern projection lens and a fringe pattern taking lens has distortion aberration. For example, when an object of 200 mm in width is measured by use of a lens having a distortion aberration of 0.5%, an error of 1.0 mm is caused by the distortion aberration. Although measurement can be compensated to some extent by calculation, it is clear that there is a limitation on the compensation by the calculation. The problem of the distortion aberration is ditto for the light section method.

Still further, optical calibration is performed for a measurement coordinate system. However, when a measuring unit is mounted on a NC (numerical control) machine tool and measurement is performed and the NC machine tool is controlled by use of the measured data, the axis of the measuring unit does not agree with the axis of the machine tool, which causes errors. In this case, the calibration of the measuring unit by the coordinate system of the machine tool is desired, but a method of calibration has not been known.

Still further, conventionally, a high technique and a long time are required to calibrate the parameters of the measuring unit with high accuracy and hence a request of recalibration requiring high accuracy is usually made to a manufacturer of the measuring unit. In the case of using the measuring unit in the manufacture of products, there is presented an economic problem such as manufacture shutdown. A method has not been known by which anybody can easily perform calibration in a short time without any particular technique.

SUMMARY OF THE INVENTION

Therefore, one object of the present invention is to provide a new measuring technique capable of eliminating system errors in a non-contact type optical measurement.

Another object of the invention is to provide a new measuring technique that can calibrate a measuring unit in the coordinate system of a computer numerical control (CNC) apparatus, which is different in the coordinate system from the measuring unit and can perform a calibration work easily and quickly.

Still another object of the invention is to provide a new measuring technique that can guarantee the horizontality and flatness in measurement values on a plane if an accidental error is not caused and can reduce the effect of distortion aberration of a lens.

A measuring apparatus according to a first aspect of the present invention comprises: a projector that projects a grating fringe; a camera that photographs an image; a generator that generates, from a photographed image of a fringe pattern projected by the projector at the time of calibration onto each of surfaces having a plurality of heights, a first set including first tuples, each first tuple comprising coordinates of a point on a light receiving plane of the camera, light intensity of the point, and the height of the surface, and stores data of the first set into a storage device, wherein the number of the points in a longitudinal direction and the number of the points in a lateral direction are common to each of the surfaces; and a converter that converts the light intensity to a phase angle of the projected fringe pattern, and generates a second set including second tuples, for constructing a rectangular grid by using each second tuple as a node, each second tuple comprising the coordinates of the point on the light receiving plane, the phase angle and the height of the surface, and stores data of the second set in the storage device.

In this manner, by holding the second set including the second tuples, each comprising the coordinates of the point on the light receiving plane of the camera, the height of the surface and the phase angle of the projected fringe pattern, the data at the measurement of the coordinates of an entity corresponding to the point on the light receiving plane and the phase angle of the projected fringe pattern, is made to suitably correspond to the data of the height of an object, and hence at the time of the measurement, the height of an object to be measured can be determined from the coordinates of the point on the light receiving plane and the phase angle of the projected fringe pattern. Because calibration is carried out in this manner only by use of the measured data, systematic errors are eliminated. Here, as for the aforementioned surface, a flat plane is more advantageous from the viewpoint of manufacturing the unit and keeping accuracy but even a curved surface does not present any problem in realizing the function.

Further, the measuring unit according to the first aspect of the invention may further comprise a hypersurface generator that generates data representing a tensor product type composite hypersurface from the data of the second set, and stores the data in the storage device. In this manner, according to the invention, the relationship among the coordinates of the points on the light receiving plane, the phase angles, and the height is expressed by a form of the tensor product type composite hypersurface in a four-dimensional space (coordinates of the point (two dimensions) on the light receiving plane, phase angle (one dimension), and height (one dimension). Therefore, total four dimensions). The tensor product type composite hypersurface in the four-dimensional space is obtained by increasing a tensor product type composite surface in a three-dimensional space by one dimension.

The tensor product type composite surface in the three-dimensional space, as described in detail in "Curves and Surfaces for CAGD: A Practical Guide", by Gerald E. Farin, Academic Press Inc.: ISBN: 0122490517, is expressed as follows: "a curved surface is viewed as the trace of a curve (hereinafter referred to as "the first curve") moving in a space while changing its shape" and "the moving first curve" is expressed by control points (hereinafter referred to as "the first control points") and assuming that the first control points move along a certain curve (hereinafter referred to as "the second curve"), the first control points are expressed by other different control points.

Because the first curve moves along the second curve, the number of control points expressing the first curve is equal to the number of control points expressing the second curve and hence the rectangular grid is constructed of the points, the number of which is common to each of the surfaces in the longitudinal direction and in the lateral direction.

The tensor product type composite hypersurface in the four-dimensional space can be obtained as follows: "a hypersurface is viewed as the trace of a curved surface moving in a space while changing its shape" and the tensor product type composite surface in the three-dimensional space is expressed by use of control points (hereinafter referred to as "the second control points") and assuming that the second control points move along the third coordinate (for example, time), the second control points are further expressed by other different third control points. Although the tensor product type composite hypersurface generated in this manner is approximate, if the number of sets included in the second set is sufficiently large, sufficient accuracy can be acquired.

As a formula expressing this tensor product type composite hypersurface, a formula in which the dimension of a Bezier surface or a B-Spline surface is increased by one dimension can be used. Incidentally, the tensor product type composite hypersurface in the invention also includes a hypersurface obtained by increasing the dimension of a rational Bezier surface or a rational B-Spline curved surface, which is a projective transformation of a tensor product type composite surface, by one dimension. Further, it is possible to adopt a method in which the hypersurface expresses a difference from a theoretical formula described in the aforementioned papers in place of expressing coordinate values as a mathematically equivalent method.

Further, the aforementioned hypersurface generator may calculate control points of the tensor product type composite hypersurface by using the data of the second group as input points. This group of the control points becomes data expressing the tensor product type composite hypersurface.

Furthermore, the measuring apparatus according to the first aspect of the invention may further comprise: an extractor that extracts data of third sets, each third set including coordinates of a point on the light receiving plane of the camera and light intensity from a photographed image of a fringe pattern projected at the time of measurement to an object to be measured by the projector, and stores the data in the storage device; a second converter that converts the light intensity to a phase angle of the projected fringe pattern to generate data of fourth tuples, each tuple including the coordinates of the point on the light receiving plane and the phase angle, and stores the data in the storage device; and an interpolator that carries out interpolation by using data representing a tensor product type composite hypersurface to generate height data corresponding to the data of the fourth tuples including the coordinates of the point on the light receiving plane and the phase angle, and stores the height data in the storage device.

The interpolated data of measurement results can be obtained under the same condition as at the time of the calibration except for the inclination of a measurement surface, so that the influence of accuracy of the fringe pattern and the influence of accuracy of the calibration parameters can be reduced. Further, because on a height-constant surface, the measurement is performed under the same condition as at the time of the calibration, horizontality and flatness can be guaranteed. Incidentally, the interpolation can be performed by referring to a hypersurface together with the provided coordinates of the point on the light receiving plane and the provided phase angle and by solving an intersection problem of the hypersurface and a straight line. This can be performed by means of, for example, a Jacobian inversion method, which is a multi-dimensional Newton method.

Further, the measuring apparatus according to the first aspect of the invention may further comprise a second generator that generates, from an image of each of surfaces, which have one height or a plurality of heights and include a plurality of points whose actual coordinates are found, a third set including a plurality of fifth tuples, each fifth tuple including the coordinates of a point on the light receiving plane of the camera, actual coordinates of the point on the surface and the height of the surface, wherein the image is photographed at the time of the calibration by the camera without projecting the fringe pattern by the projector, and stores data of the third group in the storage device.

In this manner, by using the third set including the fifth tuples, the coordinates of the point on the light receiving plane, the height of the surface, and the actual coordinates on the surface, not the phase angle of the projected fringe pattern, the space can be suitably expressed. Here, as for the aforementioned surface, a flat plane is more advantageous from the viewpoint of manufacturing the unit and keeping accuracy, but even a curved surface does not present any problem in realizing the function.

Further, the measuring apparatus according to the first aspect of the invention may further comprise a second hypersurface generator that generates data representing a second tensor product type composite hypersurface from the data of the third set, and stores the data in the storage device.

Still further, the measuring apparatus according to the first aspect of the invention may further comprise: a second interpolator that carries out interpolation to generate data of the actual coordinates corresponding to data of a tuple including the height data generated by the interpolator and the corresponding coordinates on the light receiving plane by using data representing the second tensor product type composite hypersurface, and stores the data in the storage device.

In this manner, the distortion aberration of the lens can be eliminated. Incidentally, as for the directions of X axis and Y axis for the actual coordinate system, a space can be expressed also by a curved surface, not by a hypersurface.

In addition, a measuring apparatus according to a second aspect of the present invention comprises: a projector that projects slit light; a camera that photographs an image; and a generator that generates, from a photographed image of a projection pattern projected by the projector at a time of calibration onto each of surfaces having a plurality of heights, a first set of first tuples, each first tuple including coordinates of a point in a portion, to which the slit light is projected, on the light receiving plane of the camera and the height of the surface, and stores the data in the storage device. In this manner, in the light section method, at the time of the calibration in the direction of the height, the number of kinds of data acquired at the calibration can be reduced by one.

Hence, the measuring apparatus according to the second aspect of the invention may further comprise a surface generator that generates data representing a tensor product type composite surface from the data of the first set stored in the storage device, and stores the data in the storage device. As for the direction of the height in the light section method, it is enough to generate data expressing not the tensor product type composite hypersurface but the tensor product type composite surface. This can reduce calculation load.

Further, the measuring apparatus according to the second aspect of the invention may further comprise: an extractor that extracts, from a photographed image of a projection pattern projected at a time of measurement onto an object to be measured, data of coordinates of a point in a portion, onto which the slit light is projected, on the light receiving plane of the camera, and stores the data in the storage device; and an interpolator that carries out interpolation to generate height data corresponding to the data of the coordinates of the point on the light receiving plane, and stores the data in the storage device.

Still further, the measuring apparatus according to the second aspect of the invention may further include a second generator that generates, from an image of each of one or a plurality of surfaces with distinct height, including a plurality of points whose actual coordinates are found, a second set including a plurality of second tuples, each second tuple including the coordinates of the point on the light receiving plane of the camera, actual coordinates of a point on the surface, and the height of the surface, wherein said image is photographed at the time of calibration by the camera without projecting the slit light by the projector, and stores data of the second groups in the storage device. In this manner, as for the calibration in the directions of X axis and Y axis, even in the light section method, the same data as in the fringe pattern projecting method needs to be prepared.

Further, the measuring apparatus according to the second aspect of the invention may further comprise: a hypersurface generator that generates data representing a tensor product type composite hypersurface from data of the second groups, and stores the data in the storage device.

Still further, the measuring apparatus according to the second aspect of the invention may further comprise: a second interpolator that carries out interpolation to generate data of first actual coordinates corresponding to data of a tuple including the height data generated by the interpolator and the corresponding coordinates of the corresponding point on the light receiving plane, by using the data representing the tensor product type composite hypersurface, and stores the interpolated data in the storage device; and a compensator that compensates the data of the first actual coordinates according to positions of the projector and the camera in an entire coordinate system, and stores the compensation results in the storage device. Because the whole of the measurement portion of the object to be measured cannot be covered by one slit light, the projector and the camera need to be moved. At that time, compensation needs to be made by use of the data of this movement.

Still further, the measuring apparatus according to the second aspect of the invention may further comprise a third interpolator that carries out interpolation to generate data of coordinates of a point, which are not measured, by using the compensation results and the corresponding height data.

A measuring apparatus according to a third aspect of the present invention comprises: a projector that projects a fringe pattern; a camera that photographs an image; a generator that generates, from a photographed image of a fringe pattern projected by the projector at a time of calibration onto each of a plurality of surfaces having distinct heights by the projector, a first set including first tuples, each first tuple including coordinates of a point on a light receiving plane of the camera, to be a node of a graph structure common to each of the surfaces, light intensity of the point, and height of the surface, and stores data of the first set in a storage device; and a converter that converts the light intensity to a phase angle of the projected fringe pattern to generate a second set of second tuples for constructing a grid by using each second tuple as a node, each second tuple including coordinates of a point on said light receiving plane, the phase angle, and the height of the surface, and stores data of the second set in the storage device.

The graph includes a collection of nodes and a collection of edges each connecting two nodes and expresses the relationship between the nodes. The same effect can be produced even if a data structure different from the first aspect of the invention is used.

Further, the measuring apparatus according to the third aspect of the invention may further comprise: a hypersurface generator that generates data representing a composite hypersurface from data of the second group, and stores the data in the storage device. The composite hypersurface is obtained by increasing the dimension of an ordinary curved surface such as the divided curved surface of a tensor product type, a rational tensor product type, a triangular patch type, a triangular type and a rectangular type by a method such as sweep.

Still further, the measuring apparatus according to the third aspect of the invention may further comprise: an extractor that extracts, from an image of a fringe pattern projected by the projector onto an object to be measured at the time of measurement, a third set of third tuples, each third tuple including the coordinates of the point on the light receiving plane of the camera and the light intensity of the point, and stores data of the third set in the storage device; a converter that converts the light intensity to a phase angle in the fringe pattern to generate data of fourth tuples, each fourth tuple including the coordinates of the point on the light receiving plane and the phase angle, and stores the data in the storage device; and an interpolator that carries out interpolation to generate height data corresponding to the data of the fourth tuple including the coordinates of the point on the light receiving plane and the phase angle by using the data representing the composite hypersurface, and stores the height data in the storage device.

A computer numerical control apparatus (also called CNC apparatus) according to the invention comprises: the aforementioned measuring apparatus; and a controller that controls the height of the surface. With this configuration, the calibration can performed quickly and easily and the coordinate system of the measuring apparatus can be integrated with the coordinate system of the CNC apparatus. Here, the CNC apparatus means a mechanical apparatus having a numerical control using a computer and is typified by an NC machine tool.

The apparatus of the invention is realized, for example, by a combination of a computer and a program, and this program is stored in a storage medium or a storage device such as a flexible disk, a CD-ROM, an optical magnetic disk, a semiconductor memory, and a hard disk. Further, the program may be distributed as a digital signal through a network. Incidentally, intermediate processing results are temporarily stored in a storage device such as a main memory.

BRIEF DESCRIPTION OF THE DRAWINGS

FIG. 1 is a conceptual diagram of a principle of a light section method in a conventional technology;

FIG. 2 is a conceptual diagram of measurement calculation in the light section method in the conventional technology;

FIGS. 16A to 16C are diagrams to show examples of an actual grating pattern;

FIG. 17 is a table to show an example of data stored in the calibration data storage;

FIG. 20 is a table to show an example of data stored in the measured data storage;

DETAILED DESCRIPTION OF THE PREFERRED EMBODIMENTS

First Embodiment

Figure 3:
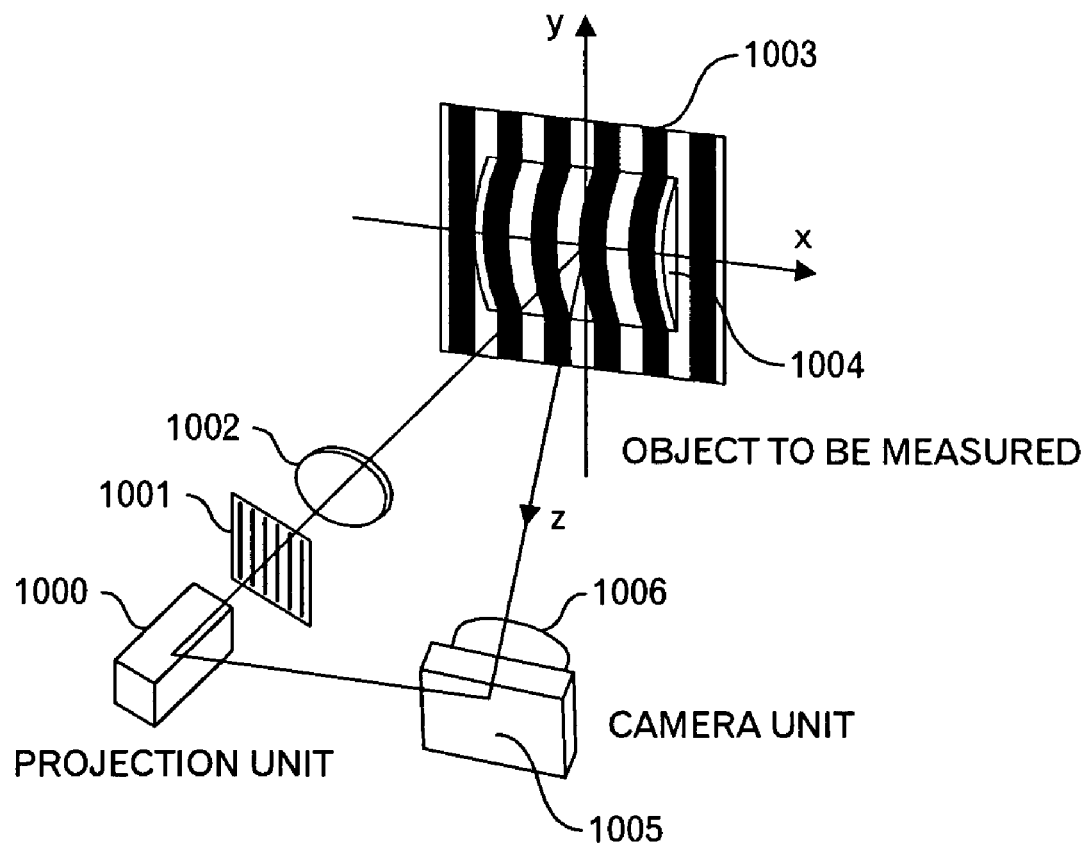
FIG. 3 is a diagram showing an apparatus configuration in a fringe pattern projection method in the conventional technology.
Figure 4:
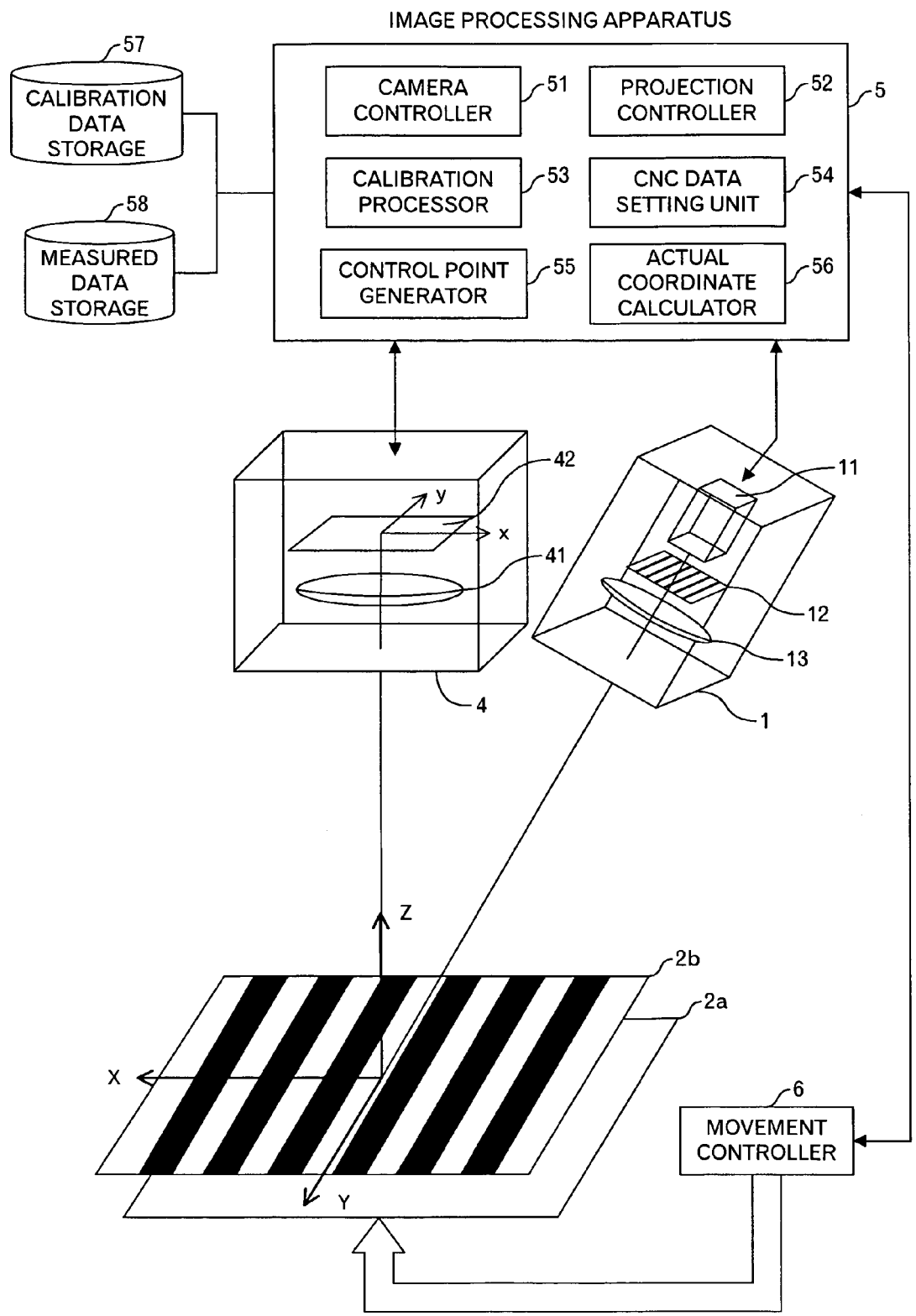
FIG. 4 is a function block diagram of a CNC apparatus including a measuring apparatus for performing a fringe pattern projection method in accordance with a first embodiment of the present invention.

FIG. 4 shows a functional block diagram in the first embodiment of the present invention using a fringe pattern projection method. A CNC apparatus (for example, a machine tool, but it is not intended to limit the CNC apparatus to the machine tool) including a measuring apparatus in this embodiment has: an image processing apparatus 5 that performs a main processing in this embodiment and is a computer; a liquid crystal projector 1 that is connected to the image processing apparatus 5 and has a projection unit 11 such as a lamp, a liquid crystal panel 12 forming a grating, and a lens 13; a camera 4 that is connected to the image processing apparatus 5 and has a lens 41, a CCD 42, and a memory (not shown); a reference plane 2 that is a reference plane at the time of calibration (however, it is assumed that a reference plane for height $Z=Z_1$ is indicated as the reference plane 2a and that a reference plane for height $Z=Z_2$ is indicated as the reference plane 2b); and a movement controller 6 that is connected to the image processing apparatus 5 and controls at least movement in a Z direction of the reference plane 2. Here, on the reference plane 2, a direction perpendicular to the fringe of a projected fringe pattern is made an X axis and the direction of fringe is made a Y axis and the optical axis of the camera 4 is set in the direction of a Z axis. On the other hand, also on the light receiving plane of the CCD 42, a direction perpendicular to the fringe of the image of the projected grating pattern is made an x axis and the direction of fringe is made a y axis. Here, large letters X, Y, Z denote axes or coordinates on an actual space and small letters x, y denote the axes or coordinates in the image on the light receiving plane.

The image processing apparatus 5 includes: a camera controller 51 for controlling the camera 4; a projection controller 52 for controlling the liquid crystal projector 1; a calibration processor 53 for performing an image processing at the time of calibration; a CNC data setting unit 54 for setting CNC data such as the height Z of the reference plane to the movement controller 6; a control point generator 55 for generating control points of a tensor product type composite hypersurface and the like at the time of calibration; and an actual coordinate calculator 56 for calculating the actual coordinates of an object to the measured at the time of measurement. Further, the image processing apparatus 5 manages a calibration data storage 57 for storing control point data of the tensor product type composite hypersurface and the like, which is generated at the time of the calibration, and a measured data storage 58 for storing actual coordinate data of the object to be measured, which is generated at the time of the measurement, and the like.

Figure 5:
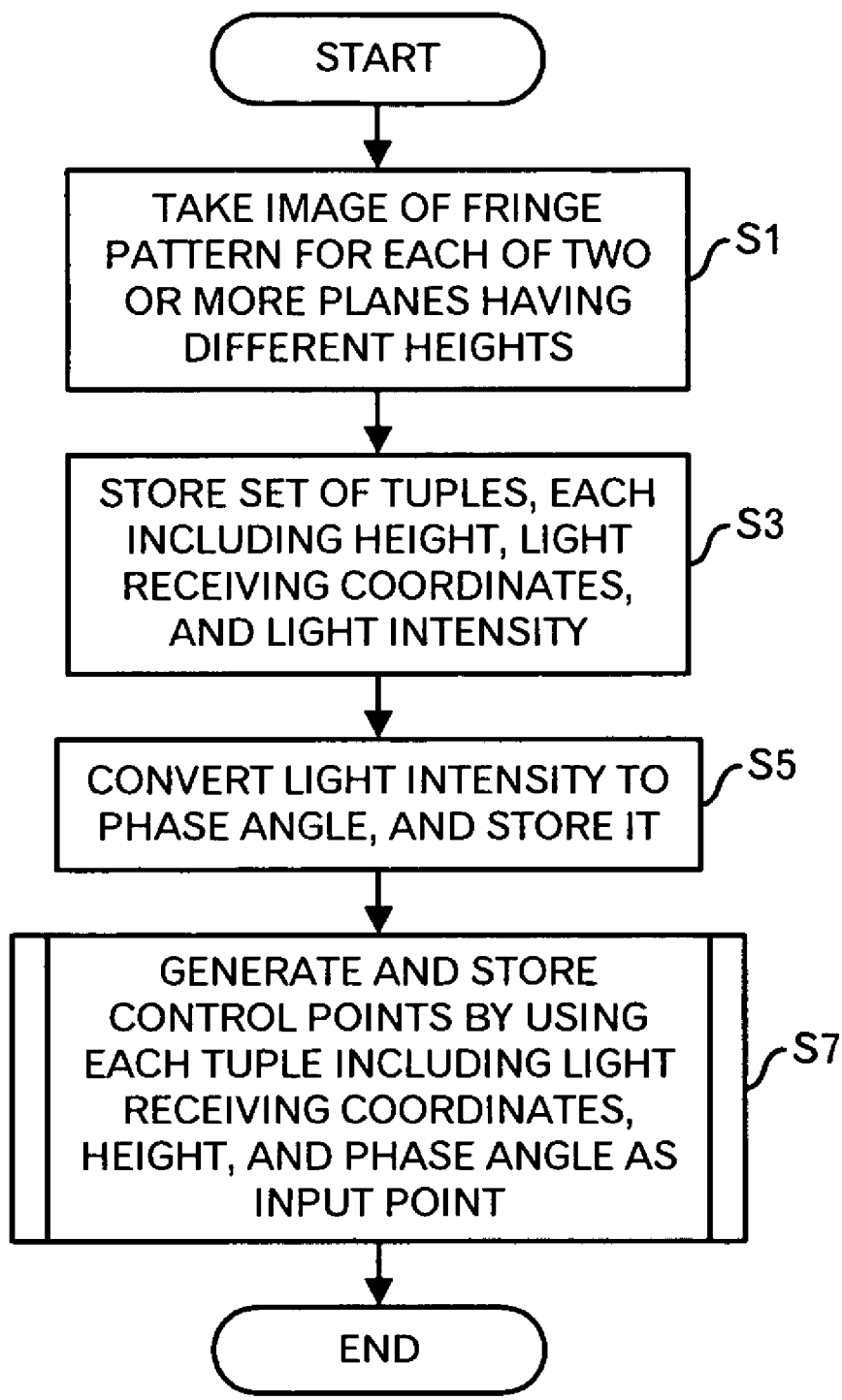
FIG. 5 is a flowchart to show an example of a processing flow at the time of calibration to measure height Z.

1. In a Case Where a Height Z is Calculated (1) Processing at the Time of the Calibration First, a processing at the time of the calibration in the case of measuring height of an object to be measured from the reference plane will be described with reference to FIGS. 5 to 12. FIG. 5 shows a processing flow. For example, when a user instructs the image processing apparatus 5 to perform a calibration processing, the CNC data setting unit 54 outputs, for example, setting data of a height Z ($=Z_1$), which is set previously, to the movement controller 6 and the movement controller 6 controls the height of the reference plane 2 to the height $Z_1$ according to the setting data of the height Z ($=Z_1$), which is received from the CNC data setting unit 54. Then, the projection controller 52 controls the liquid crystal projector 1 so as to project a predetermined grating pattern onto the reference plane 2a. The liquid crystal projector 1 forms a predetermined grating pattern by the liquid crystal panel 12 according to the instruction from the projection controller 52 and projects the predetermined grating pattern formed by the liquid crystal panel 12 onto the reference plane 2a by the projection unit 11. The camera controller 51 controls the camera 4 so as to take an image of the projected fringe pattern. The camera 4 takes the image of the projected fringe pattern by the CCD 42 according to the instruction from the camera controller 51. The data of the image taken by the CCD 42 is temporarily stored in a memory in the camera 4 and then is outputted to the image processing apparatus 5. The image processing apparatus 5 stores the image data in a storage device, for example, the calibration data storage 57.

Next, the CNC data setting unit 54 outputs, for example, the setting data of another height Z ($=Z_2$), which is previously set, to the movement controller 6 and the movement controller 6 controls the height of the reference plane 2 to the height $Z_2$ according to the setting data of the height Z ($=Z_2$), which is received from the CNC setting unit 54. Then, the projection controller 52 controls the liquid crystal projector 1 so as to project the predetermined grating pattern onto the reference plane 2b. The liquid crystal projector 1 forms the predetermined grating pattern by the liquid crystal panel 12 according to the instruction of the projection controller 52 and the projection unit 11 projects the predetermined grating pattern formed by the liquid crystal panel 12 to the reference plane 2b. Incidentally, because the projection unit 11 once projected the fringe pattern at the height $Z_1$, in the case where the projection unit 11 keeps projecting the fringe pattern without stopping, the processings of the projection controller 52 and the liquid crystal projector 1 are not required. Then, the camera controller 51 controls the camera 4 so as to take an image of the projected fringe pattern. The camera 4 takes the image of the fringe pattern by the CCD 42 according to the instruction from the camera controller 51. The data of the image taken by the CCD 42 is temporarily stored in the memory of the camera 4 and then is outputted to the image processing apparatus 5. The image processing apparatus 5 stores the image data in the storage device such as the calibration data storage 57.

The above processing is repeatedly performed with the height Z of the reference plane 2 changed (step S1). At this time, the height Z of the reference plane 2 needs to be changed at least one time but is preferably changed two times or more. As the number of times that the height Z is changed increases, approximation becomes more accurate, so that it is more preferable to increase the number of times that the height Z is changed.

Figure 6A:
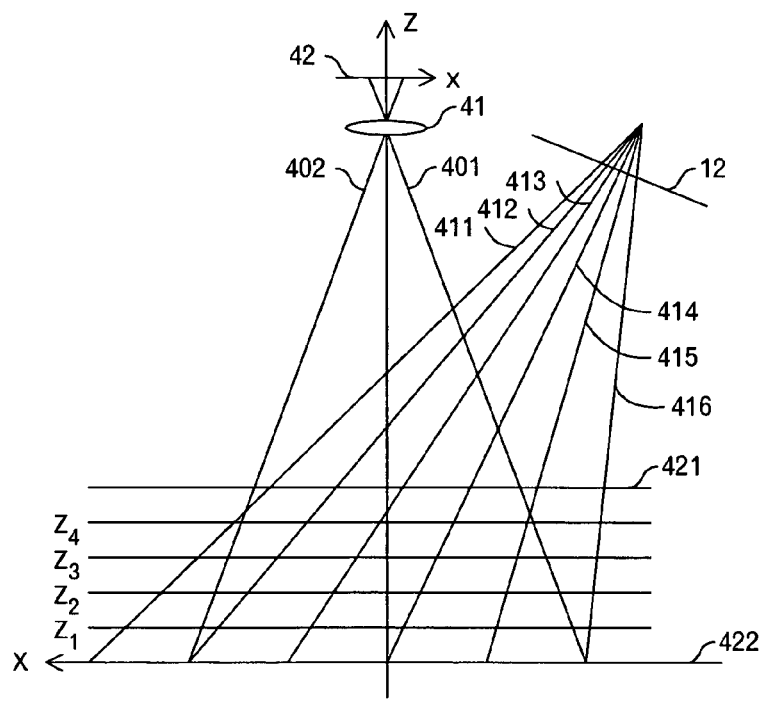
FIG. 6A is a schematic diagram to describe a manner to project a grating pattern and a manner to take an image of the fringe pattern.
Figure 6B:
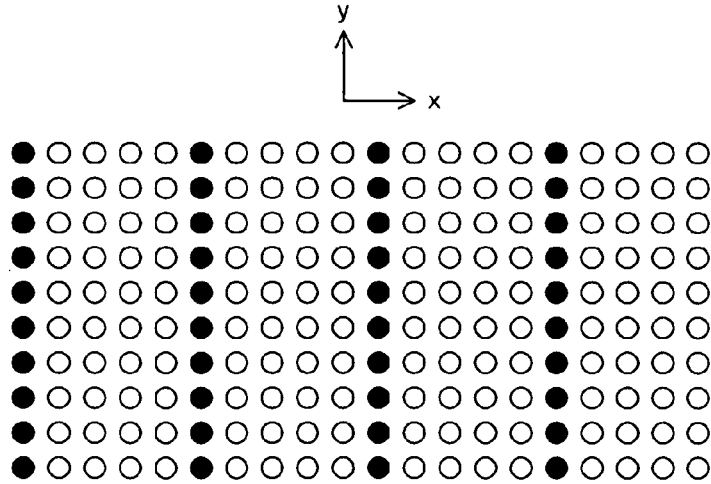
FIGS. 6B and 6C are diagrams to show examples of the photographed images.
Figure 6C:
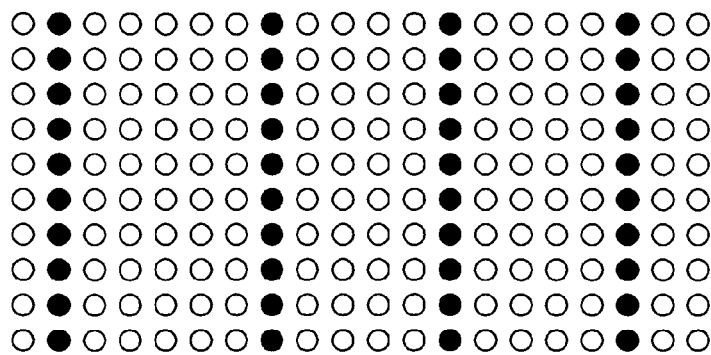

The conceptual diagram of taking the images at step S1 is shown in FIGS. 6A to 6C. FIG. 6A is a schematic diagram in a case where the Z axis shown in FIG. 4 is perpendicular to the line of sight. By irradiating the reference plane 2 with light via the liquid crystal panel 12, which is provided in the liquid crystal projector 1 and on which the predetermined grating pattern is formed, the projected fringe pattern is projected onto the reference plane 2. In FIG. 6A, the lowest height of measurement is shown by a straight line 422 and the highest height of measurement is shown by a straight line 421. Straight lines, which are parallel to the straight lines 421 and 422 and have constant heights represents the reference planes 2. Here, four reference planes $Z_1$ to $Z_4$ are shown. In the projected fringe pattern, light is interrupted, for example, by liquid crystal panel 12 and straight lines having a constant phase angle Φ are represented by straight lines 411 to 416. That is, the phase angle Φ is constant on any one of the straight lines 411 to 416 and is denoted by a black line on any of the reference planes 2. A region where the image is taken is a region surrounded by the straight lines 401 and 402 and a region surrounded by the straight lines 401, 402 and the straight line 421 representing the upper limit of measurement and the straight line 422 representing the lower limit of measurement is a region where measurement can be performed (i.e. measurement volume).

When the projected fringe pattern, which is projected onto the reference plane 2 via the lens 41, is photographed by the CCD 42 in this state, for example, images as shown in FIGS. 6B and 6C are obtained. Here, it is assumed that light is interrupted only in the portions expressed by the straight lines 411 to 416 and that the number of light receiving elements (denoted by circles) of the CCD 42 in the direction of x axis is 20 and that the number of light receiving elements in the direction of y axis is 10. Further, it is assumed that FIG. 6b shows the reference plane 2a where $Z=Z_1$ and that FIG. 6C shows the reference plane 2b where $Z=Z_2$. In FIGS. 6B and 6C, white circles show the light receiving elements that detect light and black circles show the light receiving elements that do not detect light. In this manner, in a case where heights Z are different from each other, the different light receiving elements detect shades denoted by straight lines 412, 413, 414 and 415. That is, in a case where the reference planes 2 are different from each other in height, the coordinates on the light receiving plane where the phase angle Φ in the projected grating pattern is equal are different from each other. Here, there is shown a state where only 4 lines of the light receiving elements, which correspond to four straight lines 412 to 415, do not detect light and where all of other remaining light receiving elements detect light in the same way but, in reality, light intensities vary little by little in a direction orthogonal to the fringe is detected by the respective light receiving elements.

Returning to the processing flow shown in FIG. 5, the calibration processor 53 generates data of tuples, each having height Z, light receiving coordinates (x, y) on the light receiving plane and light intensity I by using the data of the image taken at step S1 and the data of height Z set by the CNC data setting unit 54, and stores a set of the tuples, for example, in the calibration data storage 57 (step S3). To be more specific, the coordinates (x, y) and the light intensity I of each pixel of the image taken at a specific height Z are associated with the specific height Z to generate data of the tuple, and data of the tuples is stored for example, in the calibration data storage 57.

Figures 7, 8:
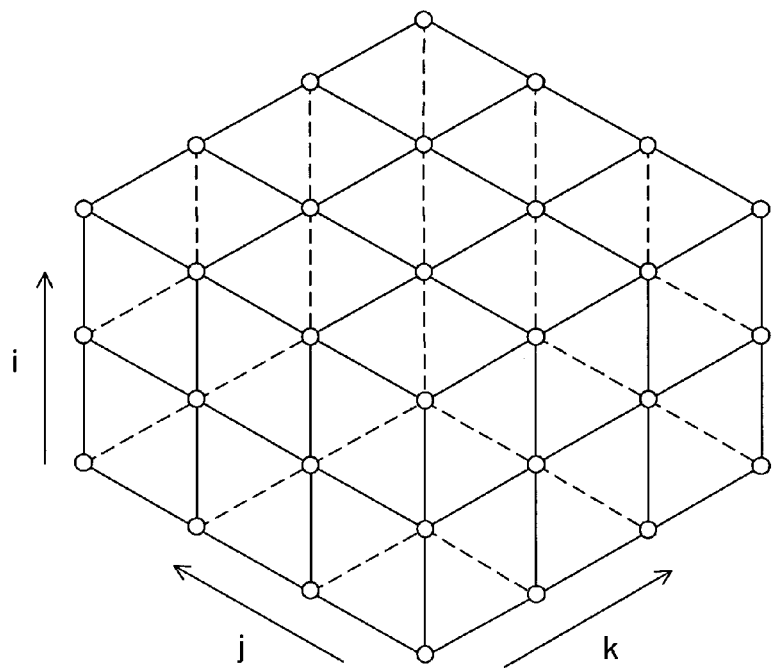
FIG. 7 is a table to show an example of data stored in a calibration data storage.
FIG. 8 is a schematic diagram to express the structure of input points, which are bases to generate control points of a tensor product type composite hypersurface.

An example of a data table stored in the calibration data storage 57 is shown in FIG. 7. In the example shown in FIG. 7, a column 501 of i representing a light receiving element number (also called as fringe number), for example, in the Z direction, a column 502 of j representing the fringe number, for example, in the x direction, a column 503 of k representing the fringe number, for example, in the y direction, a column 504 of the x coordinate of the light receiving element, a column 505 of the y coordinate of the light receiving element, a column 506 of the height Z (also called as Z coordinate), a column 507 of the light intensity I, and a column 508 of the phase angle. In this manner, the coordinates (x, y) of the light receiving element on the light receiving plane, which is arranged in a j-th column and k-th row in the light receiving plane, and the light intensity I in a case where that light receiving element photographs at an i-th height Z are registered as one record. The phase angle is not registered at this step.

Next, the calibration processor 53 converts the light intensity I of the data stored in the calibration data storage 57 to a phase angle $\Phi$ and stores the phase angle $\Phi$, for example, in the data table shown in FIG. 7 of the calibration data storage 57 (step S5). As for a method of calculating a phase angle $\Phi$ from a light intensity I in the fringe pattern projection method, in addition to the formula (1) described in the paragraph of the background art, various methods are already invented and the phase angle $\Phi$ can be calculated by use of these technologies. Hence, the method will not be further described here.

Then, the control point generator 55 generates control points for expressing a tensor product type composite hypersurface by using each tuple composed of the light receiving coordinates (x, y), the height Z, and the phase angle $\Phi$ as an input point, and stores the control points in the calibration data storage 57 (step S7). "Hypersurface" means a geometrical entity obtained by providing one constraint in an n-dimensional space. "Composite" means that a plurality of patches exist connectively. "Tensor product" means a multilinear space. The space expressed by a set of tuples composed of the light receiving coordinates (x, y), the height Z, and the phase angle $\Phi$, which are obtained at the step S5, can be expressed by a four-dimensional tensor product type composite hypersurface. As an expression describing this four-dimensional tensor product type composite hypersurface can be used by increasing the dimension of a Bezier surface, a B-Spline surface, a rational B-Spline surface, and a NURBS surface by one dimension. By using the tensor product type composite hypersurface like this, the relationship between the height, the coordinates on the light receiving plane, and phase angle in the measurement region can be expressed with higher accuracy. Incidentally, the tensor product type composite hypersurface is used to interpolate the whole measurement volume including the measurement point, which results in providing approximation. However, because the tensor product type composite hypersurface has nice continuity, if the control points can be defined by more data, sufficient accuracy can be obtained.

Here, the input points form a rectangular grid shape as shown in FIG. 8. That is, it is a structure obtained by stacking multiple layers of FIG. 6B or FIG. 6C. However, it is essential only that a rectangular grid is formed in terms of phase and the structure is not limited to a rectangular grid made by combining cubes. Each grid point P is specified by three parameters i, j, k and each grid point P expresses a tuple composed of the coordinates (x, y) on the light receiving plane, the height Z, and the phase angle $\Phi$.

Figures 9, 10:
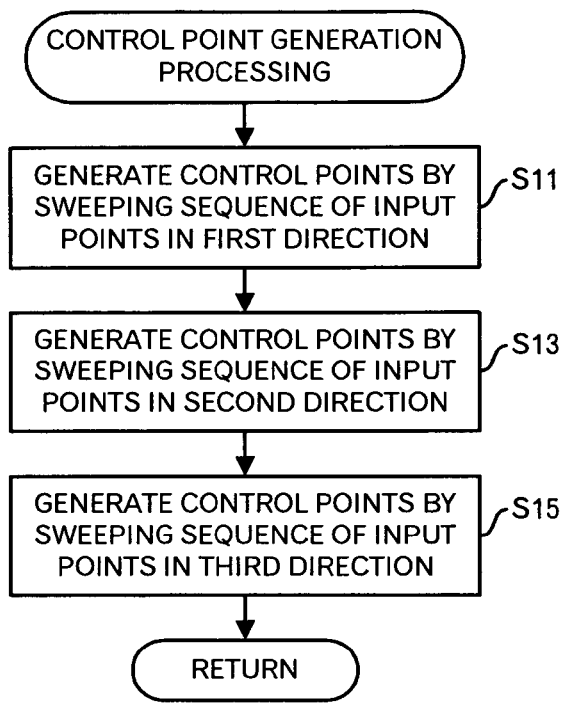
FIG. 9 is a flowchart to show an example of a processing flow of a processing of generating the control points.
FIG. 10 is a table to show an example of data stored in the calibration data storage.

In this manner, a set of input points has a rectangular grid structure shown in FIG. 8 in which continuity in the direction of sweep is guaranteed in any direction of i, j, k. Hence, control points can be determined by sweeping the input points independently in the directions of i, j, k. That is, as shown in FIG. 9, a sequence of input points is swept in the first direction (for example, i direction) to generate control points and the data of the control points is stored, for example, in the calibration data storage 57 (step S11). A sequence of input points is swept, for example, in an i direction with j and k fixed to generate control points and then a sequence of input points is swept in the i direction after j or k is changed to generate control points. This processing is repeatedly performed to generate control points for all of the sequences of input points extending in the i direction. Further, a sequence of input points is swept in the second direction (for example, j direction) to generate control points and the data of the control points is stored, for example, in the calibration data storage 57 (step S13). Also in this case, a sequence of input points are swept, for example, in a j direction with i and k fixed to generate control points and then a sequence of input points are swept in the j direction after i or k is changed to generate control points. This processing is repeatedly performed to generate control points for all of the sequence of input points extending in the j direction. Here, as for the control points already generated at the step S11, control points are generated by using the control points as input points. Then, a sequence of input points are swept in the third direction (for example, k direction) to generate control points and the data of the control points is stored, for example, in the calibration data storage 57 (step S15). A sequence of input points are swept, for example, in a k direction with i and j fixed to generate control points and then a sequence of input points are swept in the k direction after i or j is changed to generate control points. This processing is repeatedly performed to generate control points for all of the sequence of input points extending in the k direction. Also in this case, as for the control points already generated at the steps S11 and S13, control points are generated by using the control points as input points. Here, in some cases, the rectangular grid structure shown in FIG. 8 is not used but a graph structure is used.

Further, the control points are stored, for example, in the data table shown in FIG. 10 in the calibration data storage 57. In the example shown in FIG. 10, the data table has a column 800 of control point number, a column 801 of x coordinate, a column 802 of y coordinate, a column 803 of Z coordinate, and a column 804 of phase angle.

Figure 11A:
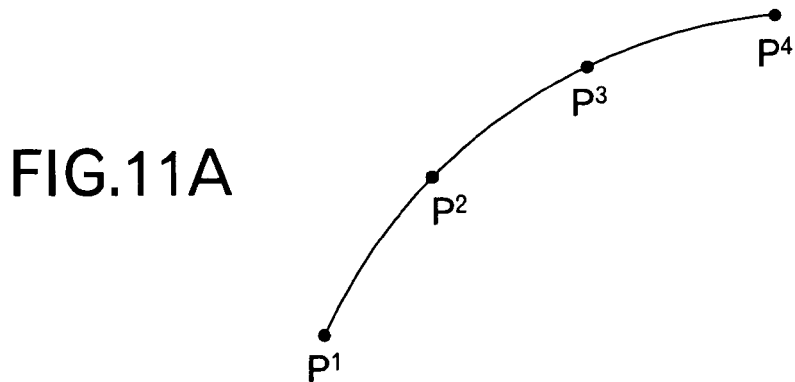
FIGS. 11A and 11B are diagrams to describe a processing of generating the control points in a Bezier curve.

Now, a method of generating the control points from the input points will be simply described. A case of using a comparatively simple cubic Bezier curve will be described. FIG. 11A shows an example of a sequence of input points. It is assumed that a sequence of input points $P^1$, $P^2$, $P^3$, and $P^4$ exist. In this case, two adjacent input points (for example, $p^1$ and $p^2$) are selected and their tangent vectors (for example, $m^1$ and $m^2$) are determined. Then, intermediate control points ($P^{11}$ and $p^{12}$) are determined as follows. Incidentally, for further detailed information, see "Curves and Surfaces for CAGD: A Practical Guide", by Gerald E Farin, Academic Press Inc.; ISBN: 0122490517.

[Mathematical formula 3]

$$P^{11} = P^1 + \frac{1}{3}m^1$$

$$P^{12} = P^2 - \frac{1}{3}m^2$$

Figure 11B:
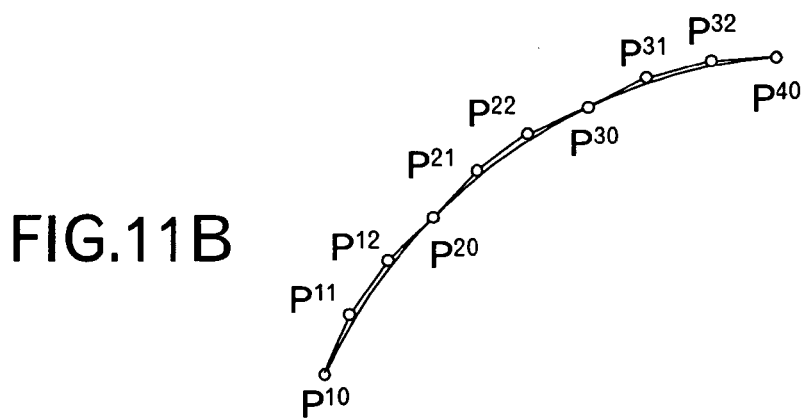

If this processing is repeatedly performed, a sequence of control points shown in FIG. 11B can be obtained. Incidentally, in the Bezier curve, a sequence of input points $P^1, p^2, p^3$, and $P^4$ are also control points. Hence, to differentiate them, they are designated by $P^{10}, P^{20}, P^{30}$, and $P^{40}$. That is, $P^{11}$ and $P^{12}$ are generated between $P^{10}$ and $p^{20}$; $P^{2l}$ and $P^{22}$ are generated between $P^{20}$ and $P^{30}$; and $P^{31}$ and $P^{32}$ are generated between $P^{30}$ and $P^{40}$ By the control points determined in this manner, the Bezier hypersurface is expressed for each three-dimensional hyperpatch corresponding to a one-dimensional segment or a two-dimensional patch by the following formula:

[Mathematical formula 4]

$$P = \sum_{i,j,k \in [0,3]} P_{ijk} B_i^3(u) B_j^3(v) B_k^3(w) \qquad (2)$$

where $B_i^n(t) = {}_nC_i t^i (1-t)^{n-i}$ and is a Bernstein polynomial. As for the Bernstein polynomial, see "Curves and Surfaces for CAGD: A Practical Guide", by Gerald E Farin, Academic Press Inc.; ISBN: 0122490517. Here, $P_{ijk}$ is a control point. The formula (2) is obtained by expanding dimension for a following formula of a Bezier surface, which has been conventionally known.

[Mathematical formula 5]

$$P = \sum_{i,j \in [0,3]} P_{ij} B_i^3(u) B_j^3(v)$$

Further, in this embodiment, it is also possible to use not only the Bezier curve but also a uniform B-Spline curve. A case of cubic B-Spline curve will be described with reference to FIG. 12. Here, $P^1, \ldots P^i, P^{i+1}, \ldots P^n$ denote a sequence of input points. On the other hand, the control points of the B-Spline curve are $Q^0, Q^1, \ldots Q^{i-1}, Q^i, Q^{i+1}, Q^{i+2}, \ldots Q^{n+1}$. In the sequence of input points P and the sequence of control points Q, points with the same superscripts correspond to each other and only $Q^0$ and $Q^{n+1}$ are additionally provided. That is, the number of control points is smaller than in the case of the Bezier curve and hence a memory capacity can be decreased when storing the data of the control points.

Figure 12:
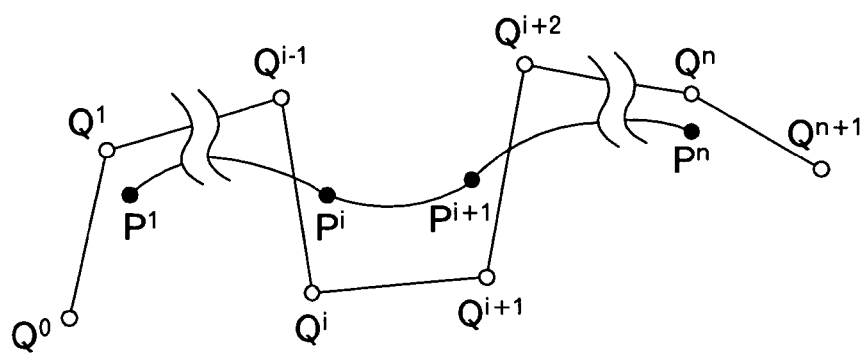
FIG. 12 is a diagram to describe a processing of generating the control points in a B-Spline curve.

To generate the sequence of control points as shown in FIG. 12, as the first step, $Q^1$ is set at the same value as $p^i$ for i=1 to n. Here, $Q^0$ is set at the same value as $Q^1$. Further, Qn+$^1$ is set at the same value as $Q^n$. As the second step, the following formula is calculated for i=1 to n and $\delta_1 + Q^i$ is set at a new $Q^1$. $Q^0$ is set at the same value as $Q^1$. Further, $Q^{n+1}$ is set at the same value as $Q^n$.

[Mathematical formula 6]

$$\delta_i = P^i - Q^i + \frac{1}{2}\left\{P^i - \frac{1}{2}(Q^{i-1} + Q^{i+1})\right\}$$

At the third step, it is determined whether or not max $[\delta_i] > \delta s$ (fixed value) and if this condition is satisfied, the processing returns to the second step. On the other hand, if this condition is not satisfied, the processing is finished. In this manner, the sequence of control points can be calculated. For further detailed contents, see "Shape Processing Engineering (II)" by Fujio Yamaguchi, published by THE NIKKAN KOGYO SHIMBUN LTD., p.69-72.

By the control points determined in this manner, the B-Spline hypersurface is expressed by the following formulas for each three-dimensional hyperpatch corresponding to one-dimensional segment or two-dimensional patch.

[Mathematical formula 7] (3)

$$P = \sum_{i,j,k \in [0,3]} Q_{ijk} X_i^3(u) X_j^3(v) X_k^3(w)$$

$$X_0^3(t) = \frac{1}{6}(1-t)^3$$

$$X_1^3(t) = \frac{1}{2}t^3 - t^2 + \frac{2}{3}$$

$$X_2^3(t) = -\frac{1}{2}t^3 + \frac{1}{2}t^2 + \frac{1}{2}t + \frac{1}{6}$$

$$X_3^3(t) = \frac{1}{6}t^3$$

where $Q_{ijk}$ is a control point.

In addition to this, a non-uniform B-spline curve and further, NURBS and a rational B-spline curve can be used, and hence a model to be used is not limited to the Bezier curve and the B-spline curve.

By performing the processing described above, data expressing the control points of the tensor product type composite hypersurface can be obtained and the height Z can be obtained at the time of measurement as described below.

Incidentally, while an example has been described above in which grid points are constructed for pixels in which the position of the photographed image is fixed, it is not intended to limit the configuration to this. For example, it is also possible that the grid points are constructed only for the pixels having a specific phase angle.

(2) Processing at the Time of Measurement

Figures 13, 14:
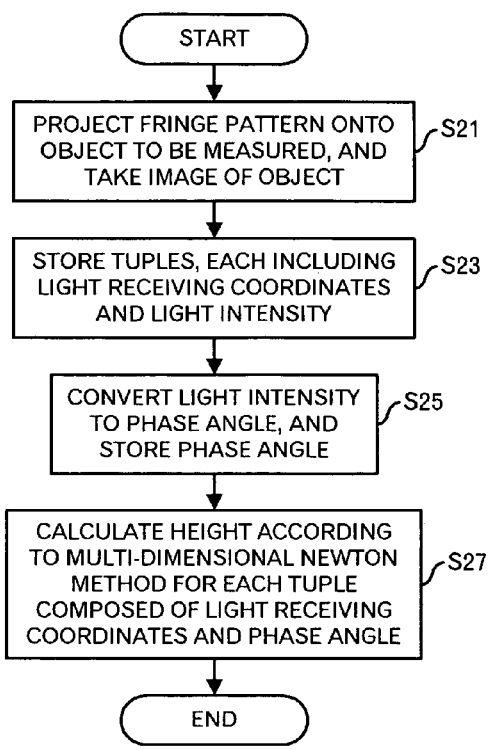
FIG. 13 is a flowchart to show an example of a processing flow at the time of measurement to measure height Z.
FIG. 14 is a table to show an example of data stored in a measured data storage.

At the time of measurement, first, a user places an object to be measured on a plane of a predetermined height (a plane in a measurement volume set between the upper limit 421 of measurement and the lower limit 422 of measurement in FIG. 6, and hereinafter referred to as "plane 2c"). Thereafter, the user instructs the image processing apparatus 5 to perform measurement. Then, the projection controller 52 controls the liquid crystal projector 1 so as to project a predetermined fringe pattern to the object to be measured, which is placed on the plane 2c. According to the instruction from the projection controller 52, the liquid crystal projector 1 forms the predetermined grating pattern by the liquid crystal panel 12 and projects the predetermined grating pattern formed by the liquid crystal panel 12 onto the object to be measured, which is placed on the plane 2c by use of the projection unit 11. Further, the camera controller 51 controls the camera 4 so as to take an image of the projected fringe pattern. The camera 4 takes the image of the projected fringe pattern by the CCD 42 according to the instruction from the camera controller 51. The data of image taken by the CCD 42 is temporarily stored in the memory in the camera 4 and then is outputted to the image processing apparatus 5. The image processing apparatus 5 stores the image data in a storage device such as measured data storage 58 (FIG. 13: step S21).

Next, the actual coordinate calculator 56 specifies a tuple of light receiving coordinates (x, y) and light intensity I, for example, on the basis of the image data stored in the measured data storage 58, and stores the tuples in the measured data storage 58, for example (step S23). FIG. 14 shows an example of a data table stored in the measured data storage 58. The example shown in FIG. 14 includes a column 1201 of pixel number, a column 1202 of the x coordinate in the light receiving plane, a column 1203 of the y coordinate, a column 1204 of light intensity I, a column 1205 of phase angle, and a column 1206 of Z coordinate. At this step, only the data of x coordinate, y coordinate, and light intensity I are registered.

Then, the actual coordinate calculator 56 refers to the data table (FIG. 14) stored in the measured data storage 58, converts the light intensity I to a phase angle Φ, and stores the phase angle Φ in the data table (FIG. 14) of the measured data storage 58 (step S25). This processing is the same as the step S5 shown in FIG. 5 and is performed by the already-existing technology. Thereafter, the actual coordinate calculator 56 calculates height Z for each set of light receiving coordinates (x, y) and light intensity I by means of a multi-dimensional Newton method (for example, Jacobian inversion method), and stores the height Z in the data table (FIG. 14) of the measured data storage 58 (step S27).

The two-dimensional Jacobian inversion method is described in "Sculptured Surface Machining" by Byoung Choi et al., Kluwer Academic Publishers, 1998 and a method simply expanded to three dimensions is used here. Hereafter, the method will be briefly described. The calculation performed here is a problem to determine Z corresponding to $x^*$, $y^*$, and $\Phi^*$ stored in the data table (FIG. 14) in a parameter expression $P(u, v, w) = (x(u, v, w), y(u, v, w), Z(u, v, w), \Phi(u, v, w))$ of the tensor product type composite hypersurface P.

As the first step, initial guess points $u_0$, $v_0$, and $w_0$ are given. Then, as the second step, $\delta u$, $\delta v$, and $\delta w$ are determined by means of three following simultaneous equations.

[Mathematical formula 8]

$$x_u(u_0, v_0, w_0)\delta u + x_v(u_0, v_0, w_0)\delta v + x_w(u_0, v_0, w_0)\delta w = x^* - x(u_0, v_0, w_0)$$

$$y_u(u_0, v_0, w_0)\delta u + y_v(u_0, v_0, w_0)\delta v + y_w(u_0, v_0, w_0)\delta w = y^* - y(u_0, v_0, w_0)$$

$$\Phi_u(u_0, v_0, w_0)\delta u + \Phi_v(u_0, v_0, w_0)\delta v + \Phi_w(u_0, v_0, w_0)\delta w = \Phi^* - \Phi(u_0, v_0, w_0)$$

where $x_u(u_0, v_0, w_0)$ is a partial derivative evaluated at $u=u_0$, $v=v_0$, $w=w_0$. This is the same as in $y_u(u_0, v_0, w_0)$ and $\Phi_0(u_0, v_0, w_0)$.

As the third step, $u_0$, $v_0$, and $w_0$ are updated in the following manner by means of $\delta u$, $\delta v$, and $\delta w$ obtained in this manner.

$$u_0 = u_0 + \delta u$$

$$v_0 = v_0 + \delta v$$

$$w_0 = w_0 + \delta w$$

Then, as the fourth step, $(x^* - X(U_0, v_0, w_0))^2 + (y^* - y(u_0, v_0, w_0))^2 + (\Phi' - (U_0, v_0, w_0))^2$ is evaluated and it is determined whether or not this is sufficiently small. In addition to this, the sum of absolute values can be used as an evaluation value. If this is sufficiently small, $u=u_0$, $v=v_0$, and $w=w_0$ which are obtained at the third step are solutions. On the other hand, if it cannot be said that this is sufficiently small, the processing returns to the second step.

Finally, $u=u_0$, $v=v_0$, and $w=w_0$ which are obtained as the solutions are substituted into, for example, the formulas (2) and (3) to obtain the height Z.

If the processing described above is performed, the height Z can be determined. Further, an influence on the accuracy of the fringe pattern as a wave can be reduced. Still further, an influence on the accuracy of the calibration parameters can be reduced. Still further, as for Z coordinate, the coordinate system of the measuring unit can be made to coincide with the coordinate system of the CNC apparatus. Still further, the calibration can be performed very easily and quickly and because measurement is conducted under the same conditions for the plane of a constant height Z, horizontality can be guaranteed if random errors are not caused.

2. Case of Determining X Coordinate and Y Coordinate

A case has been described above in which it is essential that only the height Z is determined. However, in the actual measurement, it is not so common that the X coordinate and the Y coordinate of the object to be measured are not required. A method of determining the X coordinate and the Y coordinate will be described below.

(1) Processing at the Time of Calibration

Figure 15:
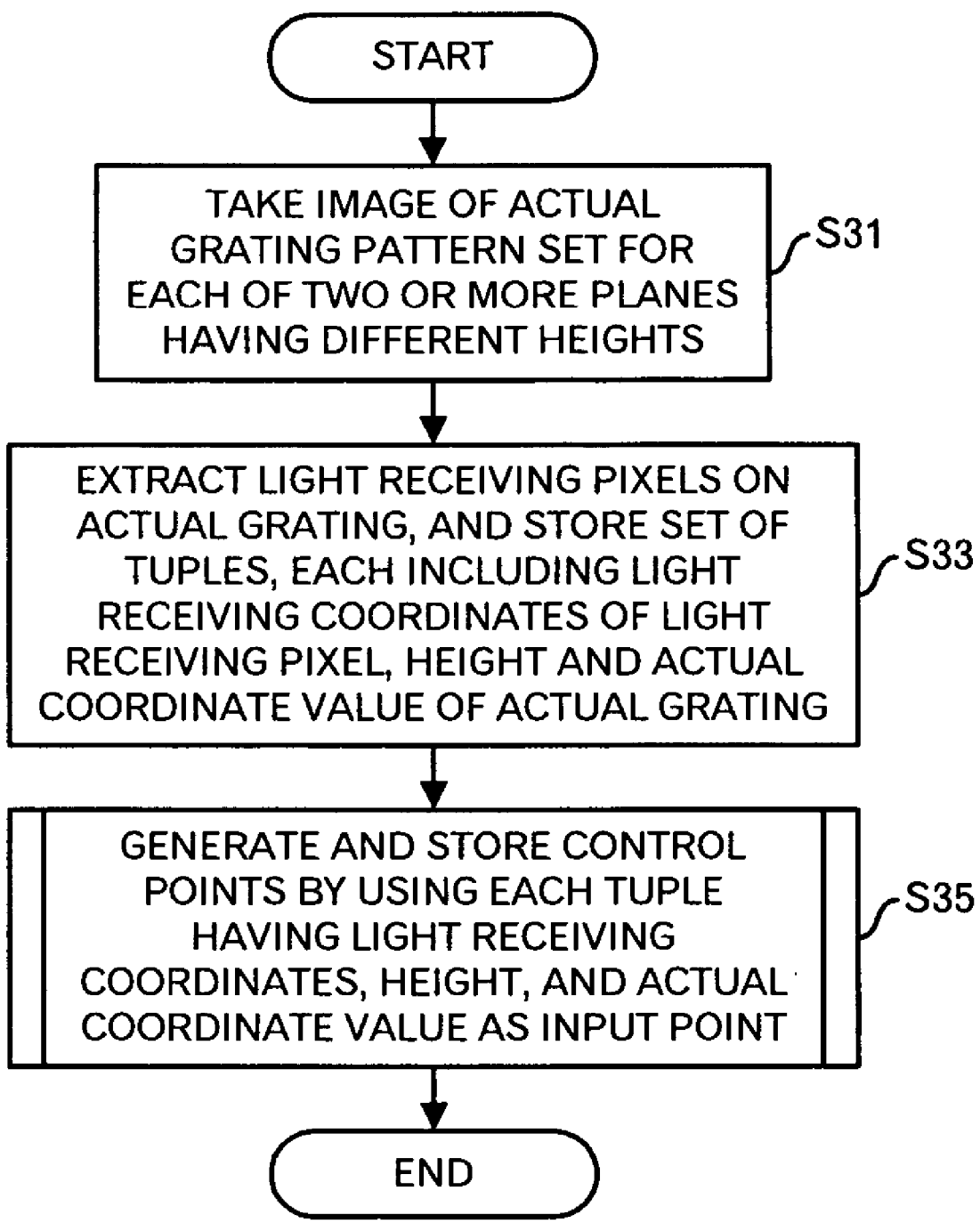
FIG. 15 is a flowchart to show an example of a processing flow at the time of calibration for measurement of X coordinate and Y coordinate.

A processing at the time of calibration will be described below with reference to a processing flow shown in FIG. 15. For example, when a user instructs the image processing apparatus 5 to perform a calibration processing, the CNC data setting unit 54 outputs setting data of height Z ($=Z_1$), which is previously set, to the movement controller 6 and the movement controller 6 controls the height of the reference plane 2 to the height $Z_1$ according to the setting data of the height Z ($=Z_1$) received from the CNC data setting unit 54.

Incidentally, at this time of calibration, it is assumed that an actual grating pattern in which X coordinate value, Y coordinate value, or X and Y coordinate values is or are already known is drawn on the reference plane 2 (or an object having an actual grating pattern drawn thereon is placed). For example, an actual grating pattern parallel to the Y axis and having an already-known X coordinate, as shown in FIG. 16A, and an actual grating pattern parallel to the X axis and having an already-known Y coordinate, as shown in FIG. 16B, are prepared separately and the following processing is performed. Alternatively, as shown in FIG. 16C, it is also possible that an intersecting pattern (checker) which is a combination of an actual pattern parallel to the X axis and having an already-known Y coordinate and an actual pattern parallel to the Y axis and having an already-known X coordinate is used. Incidentally, the projection controller 52 controls the liquid crystal projector 1 so as to irradiate the reference plane with light not as a pattern but simply as illumination. According to the instruction from the projection controller 52, the liquid crystal projector 1 irradiates the reference plane 2a with light by the projection unit 11 without forming a grating pattern by the liquid crystal panel 12.

Then, the camera controller 51 controls the camera 4 so as to take an image of the actual grating pattern. The camera 4 takes the image of the actual grating pattern by the CCD 42 according to the instruction from the camera controller 51. The data of the image taken by the CCD 42 is temporarily stored in the memory in the camera 4 and then is outputted to the image processing apparatus 5. The image processing apparatus 5 stores the image data in the storage device such as the calibration data storage 57.

Next, the CNC data setting unit 54 outputs the setting data of another height Z ($=Z_2$), which is previously set, to the movement controller 6 and the movement controller 6 controls the height of the reference plane 2 to the height $Z_2$ according to the setting data of the height Z (=$Z_2$) received from the CNC data setting unit 54. Then, the camera controller 51 controls the camera 4 so as to take an image of the actual grating pattern. The camera 4 takes the image of the actual grating pattern by the CCD 42 according to the instruction from the camera controller 51. The image data taken by the CCD 42 is temporarily stored in the memory in the camera 4 and then is outputted to the image processing apparatus 5. The image processing apparatus 5 stores the image data in the storage device such as the calibration data storage 57.

The processing described above is repeatedly performed while the height Z of the reference plane 2 is changed (step S31). At this time, the height Z of the reference plane 2 is required to be changed at least one time but is preferably changed two times or more. As the number of times that the height Z of the reference plane 2 is changed increases, approximation becomes more accurate, so that it is preferable to increase the number of times that the height Z of the reference plane 2 is changed.

Next, the calibration processor 53 reads out the image data stored, for example, in the calibration data storage 57, extracts the light receiving pixels of the actual grating pattern in the photographed image, and stores data of a group of sets, each having the light receiving coordinates (x, y), the height Z of the light receiving pixel and the actual coordinate values (X coordinate and Y coordinate, or X coordinate and Y coordinate) of the actual grating, for example, in the calibration data storage 57 (step S33). If the actual grating pattern is drawn by a black line and the other portion is in white, for example, a pixel determined to be black by the value of light intensity I can be extracted. Further, if the correspondence between the black line and the actual coordinates of the actual grating pattern can be specified by a method of appending a marker or the like to the edge of the line, it is possible to specify the actual coordinates corresponding to the extracted pixel.

FIG. 17 shows an example of a data table stored in the calibration data storage 57. The example shown in FIG. 17 includes a column 1501 of i representing a light receiving number (also designated as a grating number), for example, in the Z direction, a column 1502 of j representing a grating number, for example, in the x direction, a column 1503 of k representing a grating number, for example, in the y direction, a column 1504 of x coordinate of the light receiving element, a column 1505 of y coordinate of the light receiving element, a column 1506 of X coordinate in an actual space, a column 1507 of Y coordinate in the actual space, a column 1508 of the height Z, and a column 1509 of the light intensity I. In this manner, the coordinates (x, y) in the light receiving plane of the light receiving element that is extracted in a j-th order in the x direction and in a k-th order in the y direction on the light receiving plane, the height Z, and the light intensity I at that time, and specified actual coordinates (X coordinate, Y coordinate, or X coordinate and Y coordinate) are registered as one record. Incidentally, as for the actual coordinates, there is a case where only X coordinate is registered and there is a case where only Y coordinate is registered. Here, an example is shown in which only X coordinate is specified.

In this manner, the first set of tuples, each having light receiving coordinates (x, y), the height Z, and the actual coordinate X, and the second set of tuples, each having light receiving coordinates (x, y), the height Z, and the actual coordinate Y, are obtained. Hence, the control point generator 55 performs the processing described in connection with the step S7 (FIG. 5) to generate the control points by using each tuple included in the first or second set as input points, and stores the data of the control points, for example, in the calibration data storage 57 (step S35).

Figure 18A:
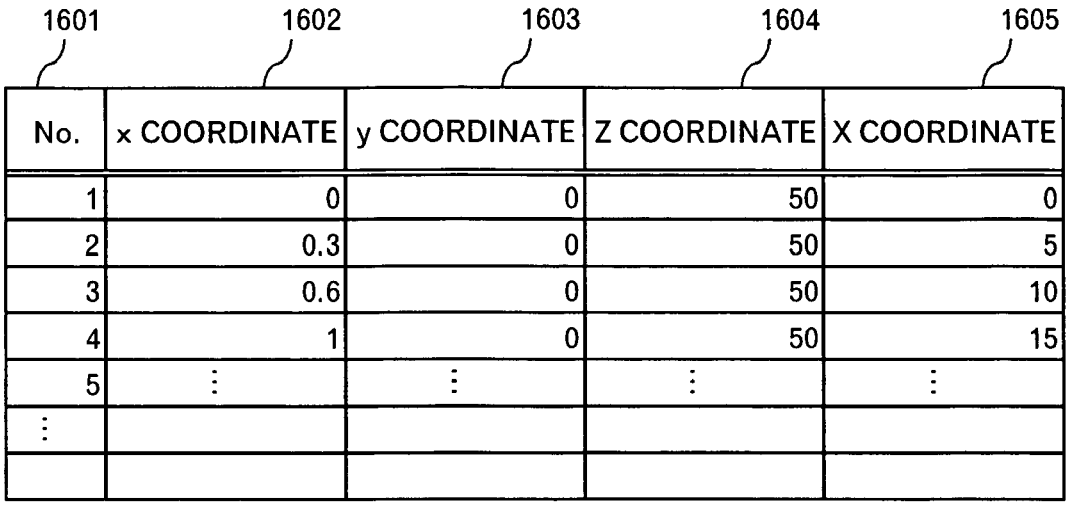
FIGS. 18A and 18B are tables to show examples of data stored in the calibration data storage.
Figure 18B:
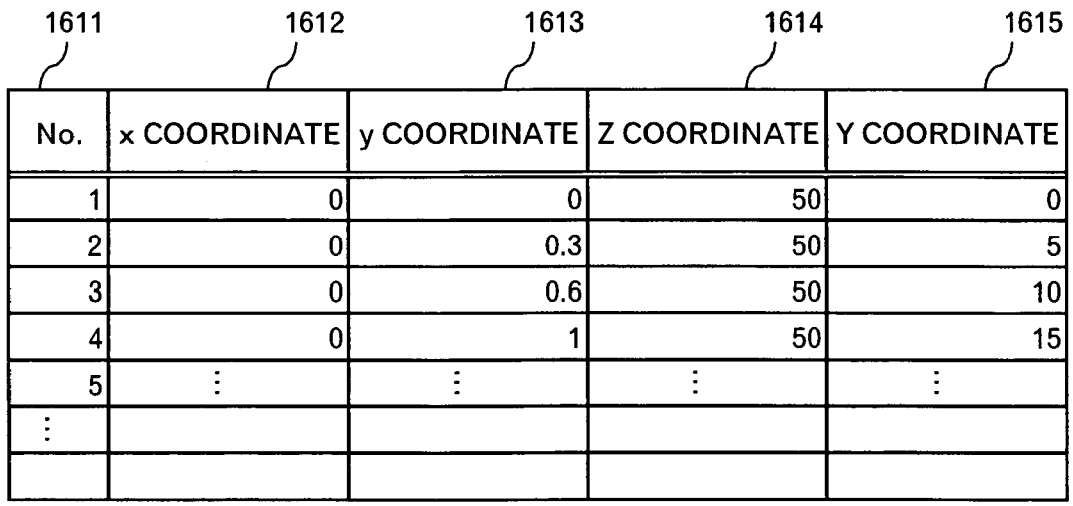

For example, data tables for the control points, as shown in FIG. 18A and FIG. 18B, are stored in the calibration data storage 57. The example shown in FIG. 18A includes a column 1601 of control point number, a column 1602 of x coordinate, a column 1603 of y coordinate, a column 1604 of Z coordinate, and a column 1605 of X coordinate. Further, the example shown in FIG. 18B includes a column 1611 of control point number, a column 1612 of x coordinate, a column 1613 of y coordinate, a column 1614 of Z coordinate, and a column 1615 of Y coordinate. In this manner, a group of control points for determining X coordinate and a group of control points for determining Y coordinate are separately stored.

Because the data expressing the tensor product type composite hypersurface is determined in this manner for X coordinate and Y coordinate, if the following processing at the time of measurement is performed, X coordinate and Y coordinate can be acquired.

(2) Processing at the Time of Measurement

Because the height Z needs to be calculated in a processing at the time of measurement, the processing at the time of measurement will be described by using a processing flow (FIG. 19) including the calculation of the height Z.

Figure 19:
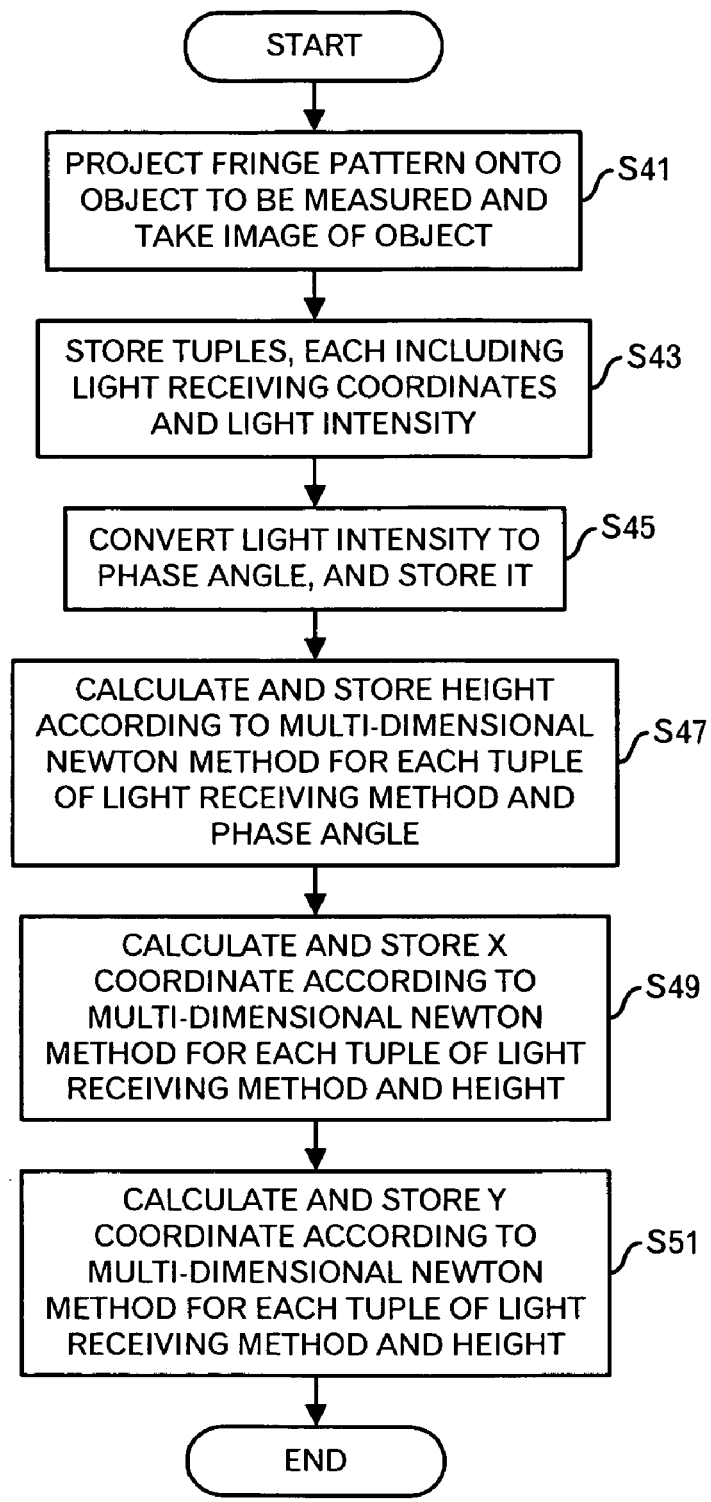
FIG. 19 is a flowchart to show an example of a processing flow at the time of measurement processing.

At the time of measurement, first, a user places an object to be measured in the measurement volume. Then, the user instructs the image processing apparatus 5 to start measurement. Then, the projection controller 52 controls the liquid crystal projector 1 so as to project a predetermined fringe pattern onto the object to be measured, which is placed in the measurement volume. According to the instruction from the projection controller 52, the liquid crystal projector 1 forms the predetermined grating pattern by the liquid crystal panel 12, and the projection unit 11 projects the predetermined grating pattern formed by the liquid crystal panel 12 onto the object to be measured on the reference plane 2. Further, the camera controller 51 controls the camera 4 so as to take an image of the projected fringe pattern. According to the instruction from the camera controller 51, the camera 4 takes the image of the projected fringe pattern by the CCD 42. The data of the image obtained by the CCD 42 is temporarily stored in the memory in the camera 4 and then is outputted to the image processing apparatus 5. The image processing apparatus 5 stores the image data in the storage device such as measured data storage 58 (FIG. 19: step S41).

Next, the actual coordinate calculator 56 specifies a tuple of light receiving coordinates (x, y) and light intensity I, for example, on the basis of the image data stored in the measured data storage 58 and stores the tuples in the measured data storage 58, for example (step S43). FIG. 20 shows an example of a data table stored in the measured data storage 58. The example shown in FIG. 20 includes a column 1801 of a pixel (light receiving element) number, a column 1802 of x coordinate on the light receiving plane, a column 1803 of y coordinate, a column 1804 of light intensity I, a column 1805 of phase angle, a column 1806 of Z coordinate, a column 1807 of X coordinate, and a column 1808 of Y coordinate. At this step, only x coordinate, y coordinate, and light intensity I are registered.

Then, the actual coordinate calculator 56 converts the light intensity I to a phase angle Φ with reference to the data table (FIG. 20) stored in the measured data storage 58 and stores the phase angle Φ in the data table (FIG. 20) of the measured data storage 58 (step S45). This processing is the same as the step S5 shown in FIG. 5 and is performed by means of the already-existing technology. Thereafter, the actual coordinate calculator 56 calculates the height Z for each set of light receiving coordinate (x, y) and phase angle Φ by means of the multi-dimensional Newton method (for example, Jacobian inversion method) and stores the height Z in the data table (FIG. 20), for example, stored in the measured data storage 58 (step S47). The processing described in relation to the step S27 is performed.

Next, an actual coordinate X is calculated for each tuple of light receiving coordinates (x, y) and height Z by means of the multi-dimensional Newton method (for example, Jacobian inversion method) and stores the actual coordinate X, for example, in the data table (FIG. 20) stored in the measured data storage 58 (step S49). It is possible that Φ in the description related to the step S27 is substituted by Z and that the same processing be performed by using the data of control points shown in FIG. 18A. Then, the X coordinate in the actual space can be obtained for each tuple of light receiving coordinates (x, y) and height Z.

Similarly, an actual coordinate Y is calculated for each tuple of light receiving coordinates (x, y) and the height Z by means of the multi-dimensional Newton method (for example, Jacobian inversion method) and stores the actual coordinate Y, for example, in the data table (FIG. 20) stored in the measured data storage 58 (step S51). It is possible that Φ in the description related to the step S27 is substituted by Z and that the same processing be performed by using the data of control points shown in FIG. 18A. Then, the Y coordinate in the actual space can be obtained for each tuple of light receiving coordinates (x, y) and height Z.

If the processing described above is performed, the X coordinate value, the Y coordinate value and the height Z of the object to be measured can be determined. Further, it is possible to reduce an influence of a camera lens or the like for the accuracy of the fringe pattern as a wave. Still further, as for the Z coordinate, the coordinate systems of the measuring unit can be made to coincide with the coordinate systems of the CNC apparatus. Still further, a calibration work can be conducted very easily and quickly and because measurement is performed under the same conditions as at the time of the calibration for the plane of a constant height Z, horizontality can be also guaranteed if random errors are not caused. Still further, because the X coordinate and the Y coordinate can be also calculated by using the tensor product type composite hypersurface, the influence of distortion aberration of the camera lens or the like can be reduced.

3. Simple measuring method of X coordinate and Y coordinate

In the method described in the previous section, X coordinate and Y coordinate are also determined from the tensor product type composite hypersurface and because there is no problem with thinking that X coordinate and Y coordinate are proportional to height Z, X coordinate and Y coordinate can be determined from the tensor product type composite surface. A processing in the case of using the tensor product type composite surface will be described in the following.

(1) Processing at the Time of Calibration

Figure 21:
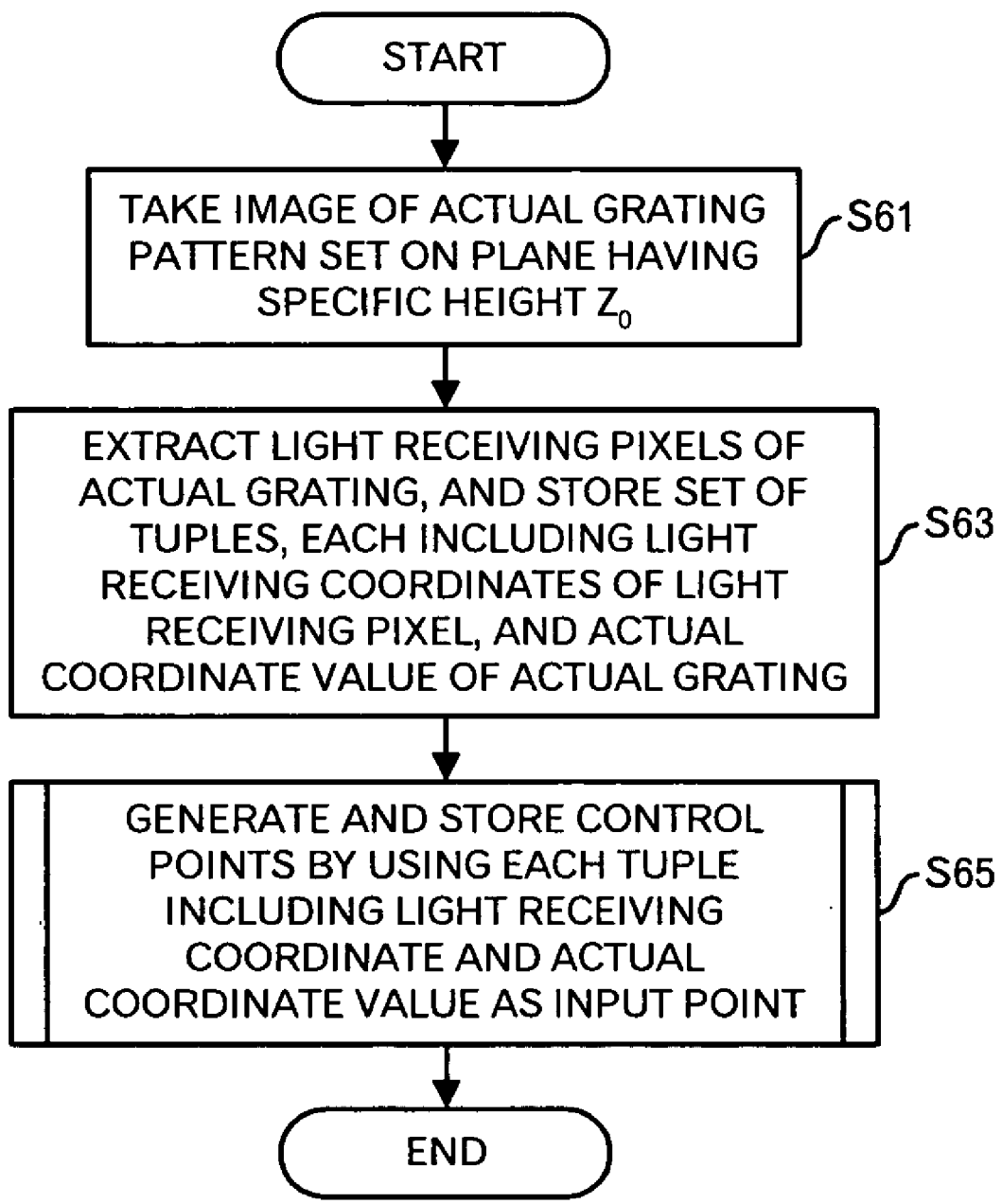
FIG. 21 is a flowchart to show an example of the second processing flow at the time of calibration processing for measurement of X coordinate and Y coordinate.

A processing at the time of calibration will be described by using FIG. 21. Here, a calibration processing related to the height Z is the same and hence its description will be omitted.

For example, when a user instructs the image processing apparatus 5 to perform a calibration processing, the CNC data setting unit 54 outputs, for example, setting data of height Z (=$Z_0$), which is previously set, to the movement controller 6. Then, the movement controller 6 controls the height of the reference plane 2 to the height $Z_0$ according to the setting data of height Z (=$Z_0$) received from the CNC data setting unit 54.

Incidentally, at this time of calibration, it is assumed that an actual grating pattern whose X coordinate value, Y coordinate value, or X and Y coordinate values is or are already known is drawn on the reference plane 2 (or an object having an actual grating pattern drawn thereon is placed on the reference plane 2). This is the same as the step S31 in FIG. 15. Further, the fringe pattern is not projected by the liquid crystal projector 1.

Then, the camera controller 51 controls the camera 4 so as to take an image of the actual grating pattern. The camera 4 takes the image of the actual grating pattern according to the instruction from the camera controller 51. The image data taken by the CCD 42 is temporarily stored in the memory in the camera 4 and then is outputted to the image processing apparatus 5. The image processing apparatus 5 stores the image data in the storage device such as calibration data storage 57 (step S61). Although the image is taken in the above processing for the reference planes 2 having a plurality of heights, here, taking the image of the reference plane 2 of one height is plenty good enough.

Next, the calibration processor 53 reads out the image data stored, for example, in the calibration data storage 57 and extracts the light receiving pixels of the actual grating pattern in the photographed image, and stores data of a set of tuples, each having the light receiving coordinates (x, y) of the light receiving pixel and the actual coordinate value of the actual grating (X coordinate, Y coordinate, or X coordinate and Y coordinate), for example, in the calibration data storage 57 (step S63). This processing is nearly equal to the step S33 shown in FIG. 15. However, at this step, the height Z is the same for all light receiving elements and hence may be stored separately. However as shown in FIG. 17, the height Z may be stored so as to correspond to the other data.

With this configuration, the first set of tuples, each including the light receiving coordinates (x, y) and the actual coordinate X, and the second set of tuples, each including the light receiving coordinates (x, y) and the actual coordinate Y, can be obtained. Hence, the control point generator 55 performs the processing described in relation to the step S7 (FIG. 5) by using each tuple included in the first set or the second set as an input point to generate control points, and stores data of the control points, for example, in the calibration data storage 57 (step S65). Incidentally, although the control points are calculated as data expressing the tensor product type composite hypersurface at step S35 shown in FIG. 15, here, the control points are calculated as data expressing the tensor product type composite surface. A method of calculating the control points is basically the same and the formulas (2) and (3) expressed by u, v, and w is expressed only by u and v. The data of the control points is stored in the form shown in FIG. 18A and FIG. 18B in the calibration data storage 57. However, the height Z does not need to be stored so as to correspond to each record.

Because the data expressing the tensor product type composite surface is determined for X coordinate and Y coordinate as described above, if the following processing at the time of measurement is performed, X coordinate and Y coordinate can be acquired.

(2) Processing at the Time of Measurement

Figure 22:
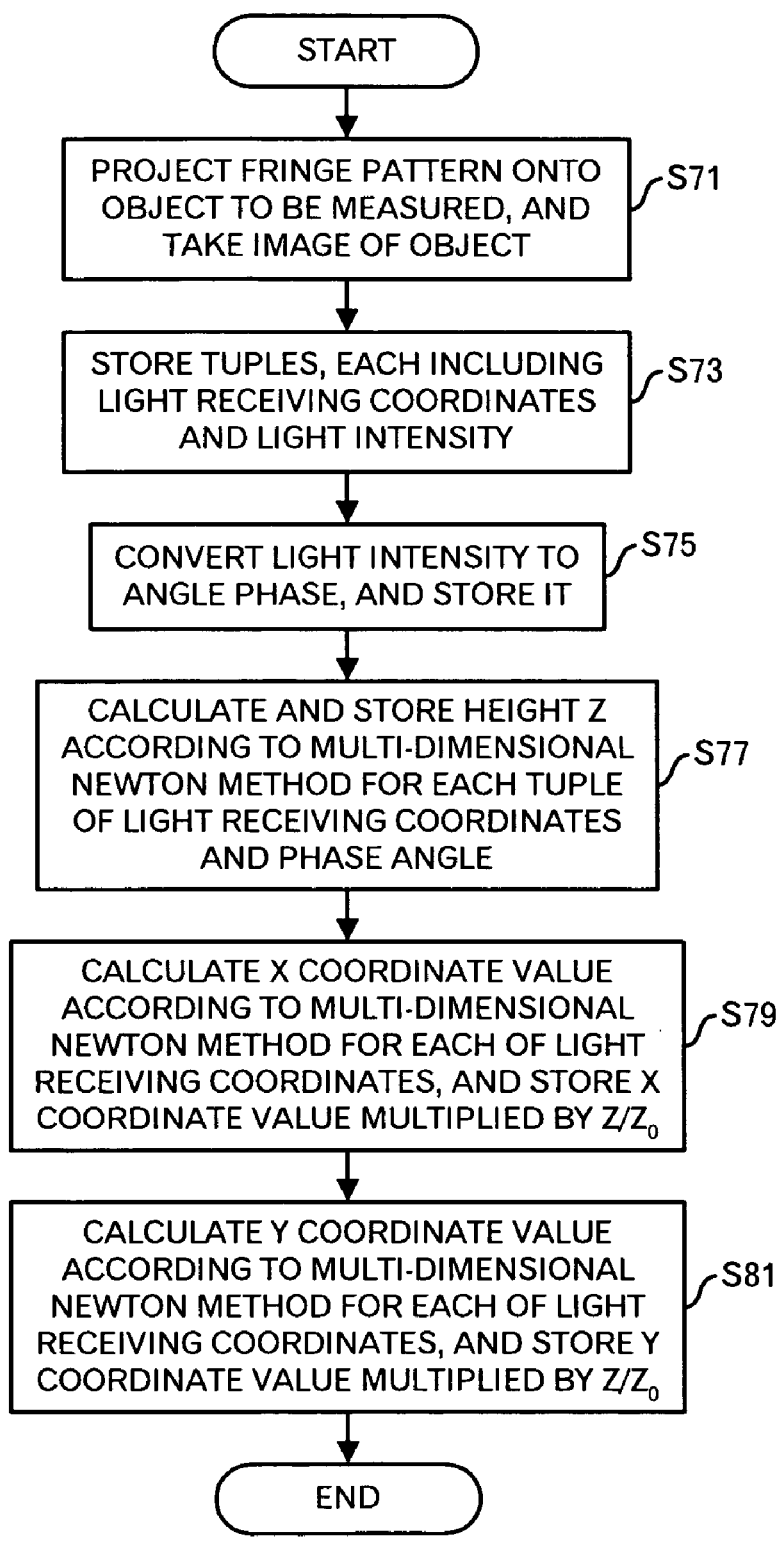
FIG. 22 is a flowchart to show an example of the second processing flow at the time of measurement processing of X coordinate and Y coordinate.

At the time of measurement, first, a user places an object to be measured in the measurement volume and instructs the image processing apparatus 5 to perform measurement. Then, the projection controller 52 controls the liquid crystal projector 1 so as to project a predetermined fringe pattern onto the object to be measured, which is placed in the measurement volume. The liquid crystal projector 1 forms the predetermined grating pattern by the liquid crystal panel 12 according to the instruction from the projection controller 52 and the projection unit 11 projects the predetermined grating pattern formed by the liquid crystal panel 12 onto the object to be measured on the reference plane 2. Further, the camera controller 51 controls the camera 4 so as to take an image of the projected fringe pattern. The camera 4 takes the image of the projected fringe pattern by the CCD 42 according to the instruction of the camera controller 51. The image data taken by the CCD 42 is temporarily stored in the memory of the camera 4 and then is outputted to the image processing apparatus 5. The image processing apparatus 5 stores the image data, for example, in the storage device such as the measured data storage 58 (FIG. 22: step S71). The step S71 is the same as the step S41.

Next, the actual coordinate calculator 56 specifies tuples, each having light receiving coordinates (x, y) and the light intensity I, for example, on the basis of the image data stored in the measured data storage 58, and stores the sets, for example, in the measured data storage 58 (step S73). The step S73 is the same as the step S43.

Then, the actual coordinate calculator 56 converts the light intensity I to a phase angle $\Phi$ with reference to a data table stored in the measured data storage 58 and stores the phase angle $\Phi$ in the data table of the measured data storage 58 (step S75). The step S75 is the same as the step S5 and step S45. Thereafter, the actual coordinate calculator 56 calculates height Z by means of the multi-dimensional Newton method (for example, Jacobian inversion method) for each tuple of the light receiving coordinates (x, y) and the phase angle $\Phi$ and stores the height Z, for example, in the data table of the measured data storage 58 (step S77). The processing described in relation to the step S27 is performed. This is the same as the step S47.

Next, the actual coordinate calculator 56 calculates the actual coordinate X by means of the multi-dimensional Newton method (for example, Jacobian inversion method) for each of the light receiving coordinates (x, y) and multiplies the calculated actual coordinate X by (height $Z/Z_0$ at the time of calibration) and stores the calculation result, for example, in the data table stored in the measured data storage 58 (step S79). The first half processing can be performed by means of the two-dimensional Jacobian inversion method itself described in the above paper and here, the obtained X coordinate value is further multiplied by ($Z/Z_0$) to determine X coordinate corresponding to the light receiving coordinates (x, y). Because the X coordinate value is proportional to the height Z, it is compensated by use of the height $Z_0$ at the time of calibration. In this manner, the X coordinate of the actual space is calculated for each tuple of the light receiving coordinates (x, y) and the height Z.

Similarly, the actual coordinate calculator 56 calculates actual coordinate Y by means of the multi-dimensional Newton method (for example, Jacobian inversion method) for each tuple of the light receiving coordinates (x, y) and the height Z and multiplies the calculated actual coordinate Y by (height $Z/Z_0$ at the time of calibration) and stores the calculation result, for example, in the data table stored in the measured data storage 58 (step S81). The first half processing can be performed by means of the two-dimensional Jacobian inversion method itself described in the above paper as well as the step S79, and here, the obtained Y coordinate is further multiplied by ($Z/Z_0$) to determine Y coordinate corresponding to the light receiving coordinates (x, y). In this manner, the Y coordinate of the actual space is calculated for each tuple of the light receiving coordinates (x, y) and the height Z.

If the processing described above is performed, the X coordinate and the Y coordinate can be calculated without using the tensor product type composite hypersurface. Because degree is lower by one dimension, the calculation load can be reduced.

Second Embodiment

Figure 23:
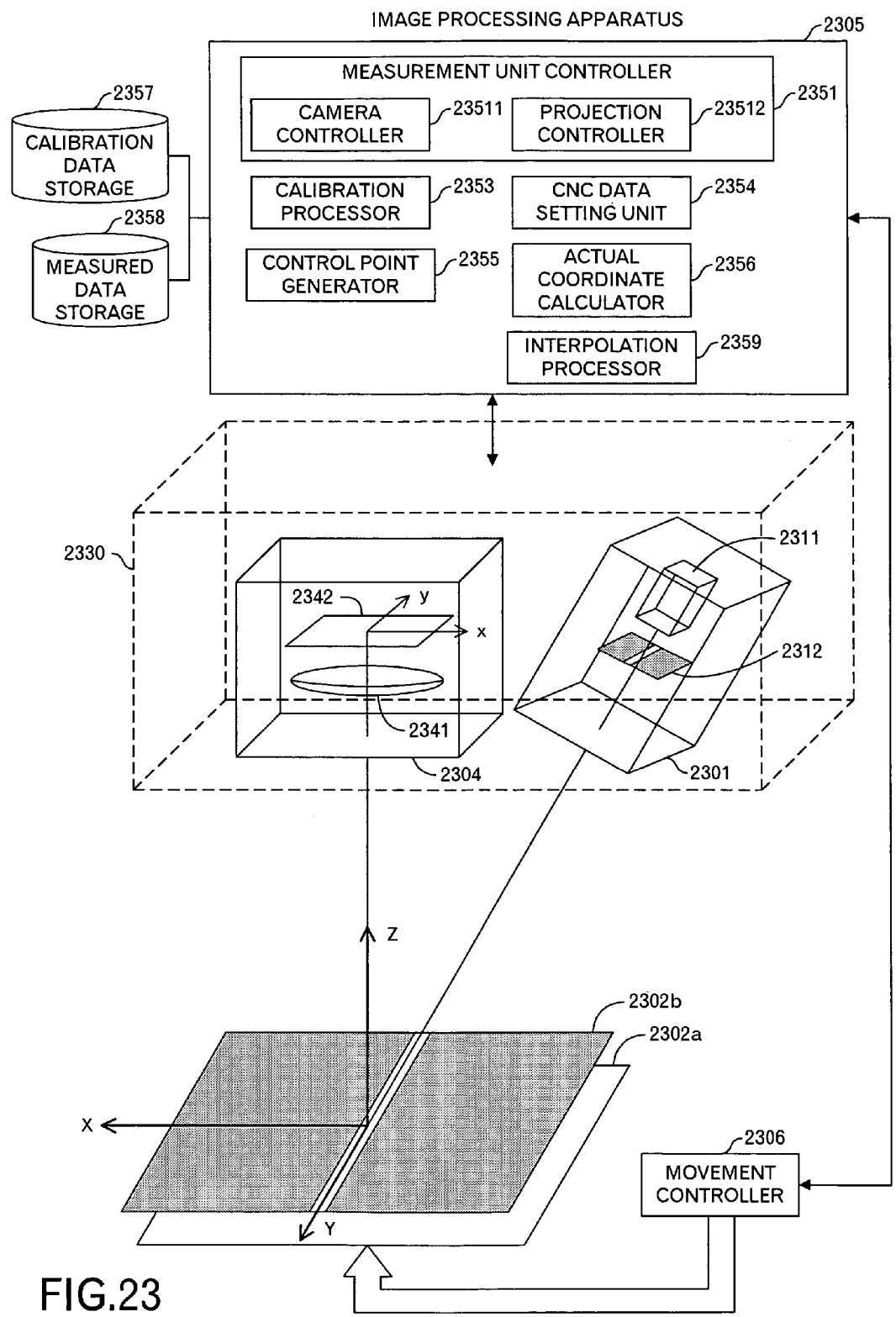
FIG. 23 is a function block diagram of a CNC apparatus including a measuring apparatus for performing an light section method in accordance with the second embodiment of the present invention.

Next, the configuration in a case of using the light section method will be described with reference to FIGS. 23 to 29. First, FIG. 23 shows a functional block diagram. A CNC apparatus including a measuring unit in this embodiment includes a image processing apparatus 2305 that performs a main processing in this embodiment and is a computer, a measurement unit 2330 having a projection unit 2301 that is connected to the image processing apparatus 2305 and projects slit light and a camera 2304, a reference plane 2302 that is used as a reference plane (where, it is assumed that a reference plane for height $Z=Z_1$ is denoted by 2302a and that a reference plane for $Z=Z_2$ is denoted by 2302b) at the time of calibration, and a movement controller 2306 that is connected to the image processing apparatus 2305 and controls movement at least in a Z direction of the reference plane 2302. The projection unit 2301 has a light source 2311 such as laser light source and a slit 2312. Further, the camera 2304 has a lens 2341, a CCD 2342, and a memory (not shown). The measurement unit 2330 has a moving mechanism (not shown) to scan an object to be measured with the slit light. The moving mechanism outputs, for example, data expressing how much the measurement unit 2330 moves from a reference position, to the image processing apparatus 2305. Here, on the reference plane 2302, it is assumed that a direction orthogonal to a bright and dark pattern caused by the slit light is X axis and that a direction of the bright and dark pattern is Y axis and the optical axis of the camera 2304 is set in a direction of Z axis. On the other hand, also on the light receiving plane of the CCD 2342, it is assumed that a direction orthogonal to a bright and dark pattern caused by the slit light is x axis and that a direction of the bright and dark pattern is y axis. Here, it is assumed that large letters X, Y, Z represent axes or coordinates in the actual space and that small letters x, y, z represent axes or coordinates on the light receiving plane.

The image processing apparatus 2305 includes: a measurement unit controller 2351 having a camera controller 23511 for controlling the camera 2304 and a projection controller 23512 for controlling the projection unit 2301; a calibration processor 2353 for performing an image processing and the like at the time of calibration; an CNC data setting unit 2354 for setting CNC data such as the height of Z of a reference plane to the movement controller 2306; a control point generator 2355 for generating control points of a tensor product type composite hypersurface, a tensor product type composite surface or the like at the time of calibration; an actual coordinate calculator 2356 for calculating actual coordinates of an object to be measured at the time of measurement; and an interpolation processor 2359 for performing the interpolation processing for the actual coordinate of the object to be measured, which is calculated by the actual coordinate calculator 2356. Further, the image processing apparatus 2305 manages a calibration data storage 2357 for storing the data of the control points of the tensor product type composite hypersurface, the tensor product type composite surface or the like, which is generated at the time of calibration and a measured data storage 2358 for storing the data such as the actual coordinates of the object to be measured, which is generated at the time of measurement.

1. Processing at the Time of Calibration

(1) Processing at the Time of Calibration to Determine Height Z

Figure 24:
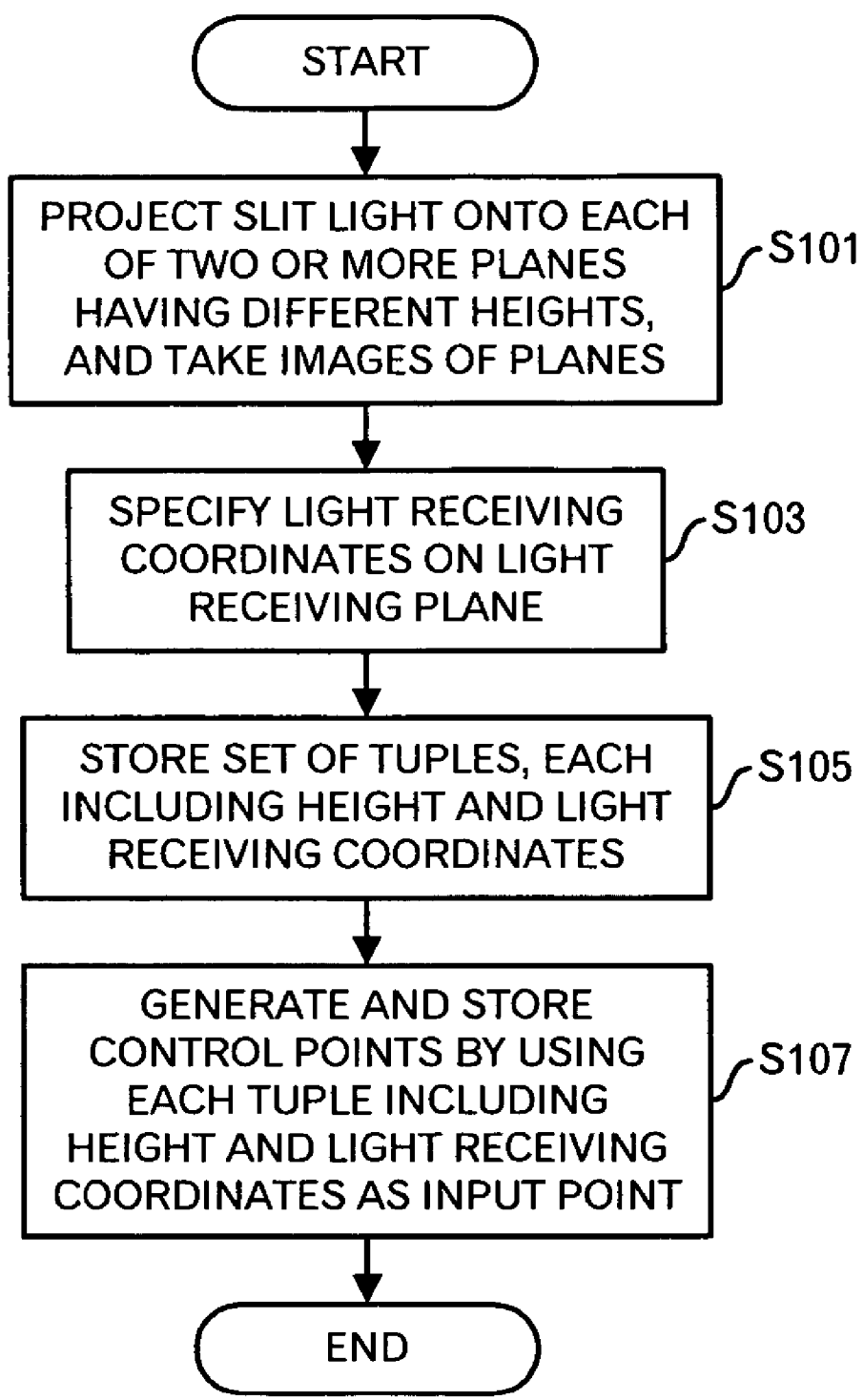
FIG. 24 is a flowchart to show a processing flow at the time of calibration to measure height Z.

A processing at the time of calibration to determine height Z will be described with reference to FIGS. 24 to 26. FIG. 24 shows a processing flow. For example, when a user instructs the image processing apparatus 2305 to perform a calibration processing, the CNC data setting unit 2354 outputs setting data of the height Z ($=Z_1$), which is previously set, to the movement controller 2306 and the movement controller 2306 controls the height of the reference plane 2302 to a height $Z_1$ according to the setting data of height Z ($=Z_1$) received from the CNC data setting unit 2354. Then, the projection controller 23512 of the measurement unit controller 2351 controls the projection unit 2301 so as to project slit light to the reference plane 2302a. The projection unit 2301 projects the slit light according to the instruction from the projection controller 23512. The camera controller 23511 of the measurement unit controller 2351 controls the camera 2304 so as to take an image of the bright and dark pattern of the projected slit light. The camera 2304 takes the image of the bright and dark pattern of the projected slit light by the CCD 2342 according to the instruction from the camera controller 23511. The data of the image taken by the CCD 2342 is temporarily stored in the memory in the camera 2304 and then is outputted to the image processing apparatus 2305. The image processing apparatus 2305 stores the image data in a storage device such as calibration data storage 2357.

Next, the CNC data setting unit 2354 outputs, for example, the setting data of another height Z ($=Z_2$), which is previously set, to the movement controller 2306 and the movement controller 2306 controls the height of the reference plane 2302 to the height $Z_2$ according to the setting data of the height Z ($=Z_2$) received from the CNC data setting unit 2354. Then, the projection controller 23512 of the measurement unit controller 2351 controls the projection unit 2301 so as to project the slit light to the reference plane 2302b. The projection unit 2301 projects the slit light according to the instruction of the projection controller 23512. Incidentally, because the projection unit 2301 once projects the slit light at the height $Z_1$, in the case where the projection unit 2301 keeps projecting the slit light without stopping, the processings by the projection controller 23512 and the projection unit 2301 are not required. Then, the camera controller 23511 of the measurement unit controller 2351 controls the camera 2304 so as to take an image of the bright and dark pattern of the projected slit light. The camera 2304 takes the image of the bright and dark pattern of the projected slit light by the CCD 2342 according to the instruction from the camera controller 23511. The data of the image taken by the CCD 2342 is temporarily stored in the memory in the camera 2304 and then is outputted to the image processing apparatus 2305. The image processing apparatus 2305 stores the image data in the storage device such as the calibration data storage 2357.

The above-described processing is repeatedly performed while the height Z of the reference plane 2302 is changed (step S101). At this time, the height Z of the reference plane 2302 needs to be changed at least one time and is preferably changed two times or more. As the number of changes of the height Z of the reference plane 2302 increases, approximation becomes more accurate and hence it is preferable to increase the number of changes of the height Z of the reference plane 2302.

Figure 25A:
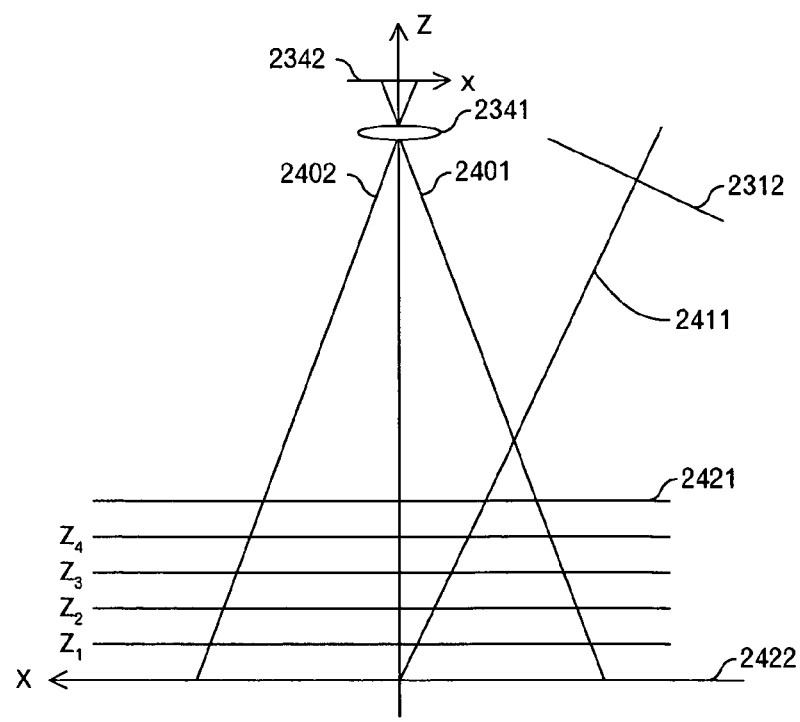
FIG. 25A is a schematic diagram to describe a manner to project slit light and a manner to photograph an image of the slit light and FIGS. 25B and 25C are diagrams to show examples of photographed images.
Figure 25B:
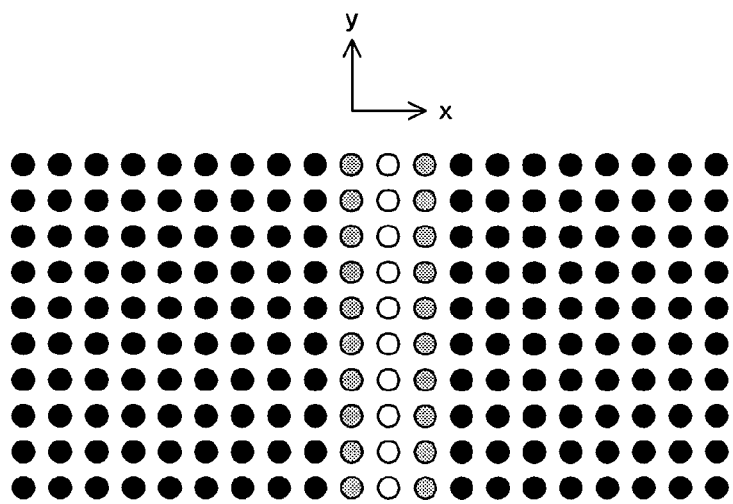
Figure 25C:
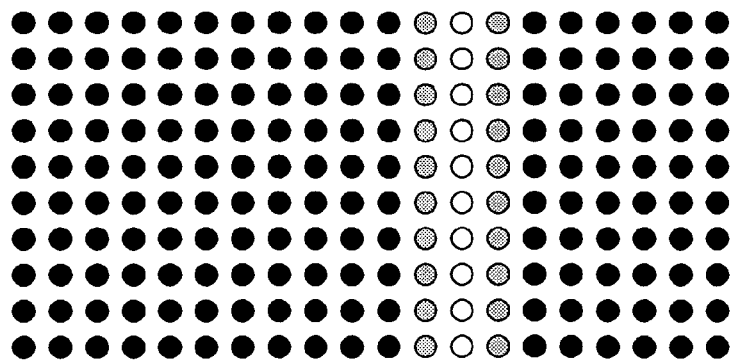

The conceptual diagram of taking the image at the step S101 is shown in FIGS. 25A to 25C. FIG. 25A is a schematic diagram in a case where a Z axis shown in FIG. 23 is made perpendicular to a line of sight. By irradiating the reference plane 2302 with laser or the like via the slit 2312 provided in the projection unit 2301, the slit light 2411 is projected to the reference plane 2302. In FIG. 25A, a height of the lower limit of measurement is represented by a straight line 2422 and a height of the upper limit of measurement is represented by a straight line 2421. Straight lines parallel to the straight lines 2421 and 2422 and having constant heights designate the reference planes 2302. Here, four reference planes $Z_1$ to $Z_4$ are shown. A region where the image is taken is a region surrounded by the straight lines 2401, 2402 and a region further surrounded by the straight line 2421 representing the upper limit of measurement and the straight line 2422 representing the lower limit of measurement becomes a measurement region (measurement volume).

When the image of the bright and dark pattern of the slit light projected to the reference plane 2302 via the lens 2341 is taken by the CCD 2342 in this condition, for example, FIGS. 25B and 25C are obtained. Here, it is assumed that only a portion designated by the straight line 2411 is irradiated with the light and that the number of light receiving elements (represented by circles) in the direction of x axis of the CCD 2342 is 20 and that the number of light receiving elements in the direction of y axis is 10. Further, it is assumed that FIG. 25B shows a case of the reference plane 2302a where $Z=Z_1$ and that FIG. 25C shows a case of the reference plane 2302b where $Z=Z_2$—In FIGS. 25B and 25C, white circles show the light receiving elements that detect light, black circles show the light receiving elements that do not detect light, and gray circles show the light receiving elements that detect intermediate light intensity. In a case where the reference planes 2302 are different from each other in height Z, different light receiving elements detect the bright line of the slit light designated by the straight line 2411. That is, when the reference planes 2302 are different from each other in height, the coordinates on the light receiving plane, at which the bright line of the slit light is detected are different. Here, there is shown a state where only a line of light receiving elements detect the light so as to correspond to the slit light and where the light receiving elements detecting intermediate light intensity are on both sides of this line of the light receiving elements and where the other remaining light receiving elements do not detect the light at all. However, there are cases where more light receiving elements detect the intermediate light intensity. Further, there are also cases where the bright line of the slit light is detected as a slant line or a curved line.

Returning to the description of the processing flow shown in FIG. 24, the calibration processor 2353 specifies the light receiving coordinates (x, y) on the light receiving plane from the data of the image taken at the step S101 and stores them in the storage device such as main memory (step S103). For example, the light receiving coordinates (x, y) on the light receiving plane, which are estimated to be the highest light intensity, are calculated by means of light intensity distribution in the direction vertical to the bright line of the slit light. Then, the calibration processor 2353 generates data of a tuple composed of the height Z and the light receiving coordinates (x, y) on the light receiving plane by using the light receiving coordinates (x, y) on the light receiving plane, which was specified by the step S103, and the data of height Z set by the CNC data setting unit 2354, and stores data of a set of the tuples, for example, in the calibration data storage 2357 (step S105).

Figures 26, 28, 29:
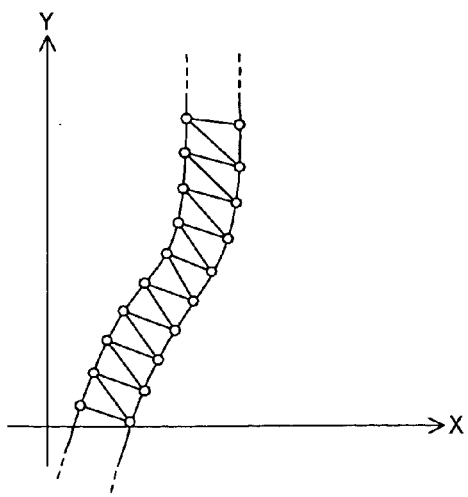
FIG. 26 is a table to show an example of data stored in the calibration data storage.
FIG. 28 is a table to show an example of data stored in the measured data storage.
FIG. 29 is a diagram to describe the outline of an interpolation processing.

An example of a data table stored in the calibration data storage 2357 is shown in FIG. 26. The example shown in FIG. 26 includes a column 2601 of i representing a fringe number, for example, in the Z direction, a column 2602 of j representing a fringe number, for example, along the bright line of the slit light, a column 2603 of the x coordinate value of the light receiving coordinates, a column 2604 of the y coordinate value of the light receiving coordinates, and a column 2605 of a height Z (also designated as Z coordinate). In this manner, the light receiving coordinates (x, y) specified along the bright line of the slit light on the light receiving plane are registered for each height Z.

Then, the control point generator 2355 generates control points to express a tensor product type composite surface by using each tuple of the light receiving coordinates (x, y) and the height Z as an input point, and stores the control points in the calibration data storage 2357 (step S107). The tensor product type composite surface is lower than the tensor product type composite hypersurface by one dimension and includes a Bezier surface, a B-spline surface, a rational B-spline surface, and a NURBS surface. The relationship between the height and coordinates on the light receiving plane in the measurement volume can be expressed more correctly by using the tensor product type composite surface like this. The tensor product type composite surface is described in various literatures such as "Curves and Surfaces for CAGD: A Practical Guide", by Gerald E. Farin, Academic Press Inc.; ISBN: 0122490517. Hence, its detailed description will be omitted here.

(2) Processing at the Time of Calibration for Determining X Coordinate and Y Coordinate This processing is the same as in the first embodiment and its description will be omitted. Here, in the processing at the time of calibration for determining X coordinate and Y coordinate, also in this embodiment, not the slit light, but simple light is projected to the whole of the reference plane 2302.

(3) Processing at the Time of Measurement

Figure 27:
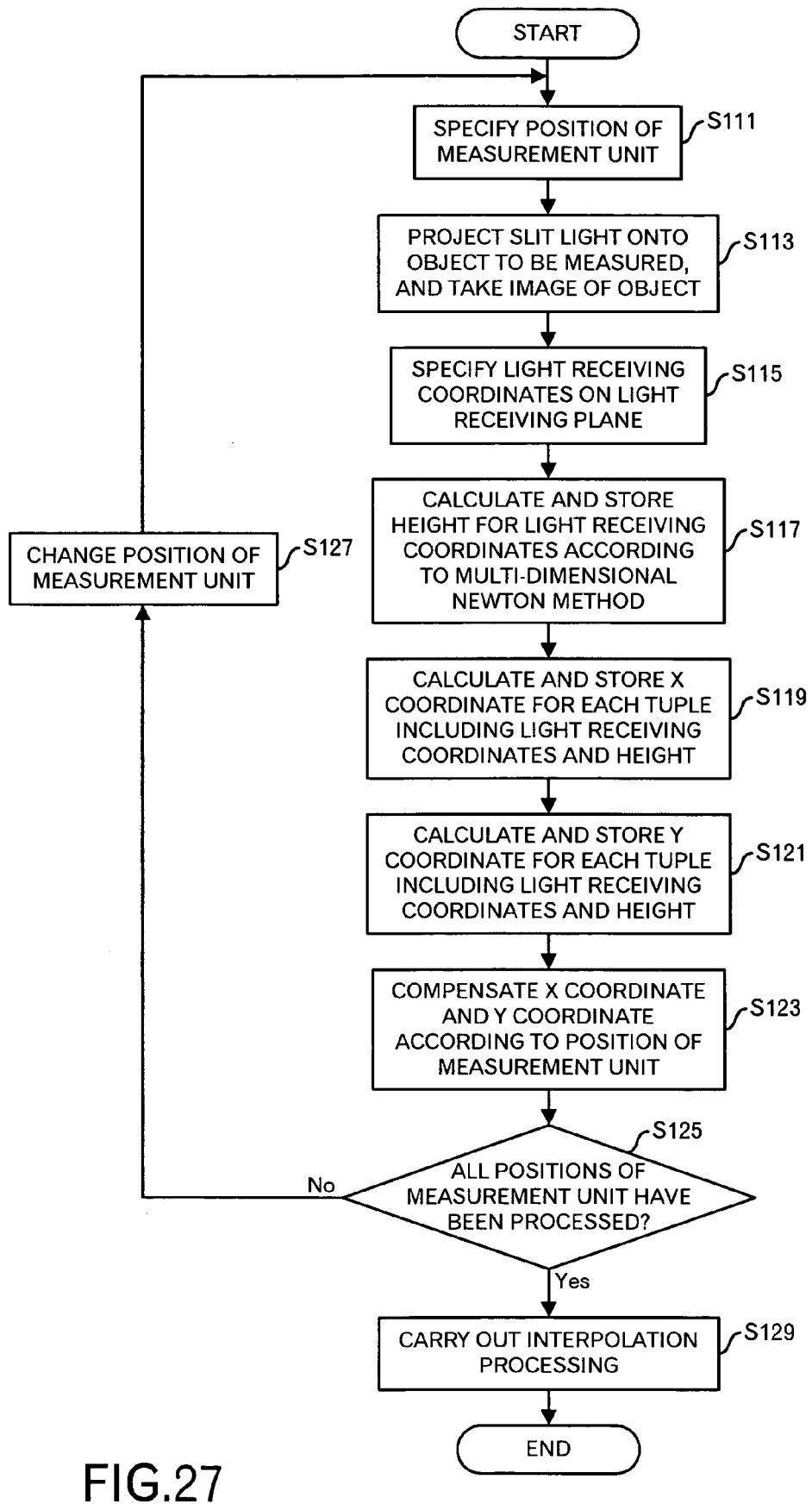
FIG. 27 is a diagram to show a processing flow at the time of measurement.

At the time of measurement, first, a user places an object to be measured in the measurement volume and then instructs the image processing apparatus 2305 to perform measurement. Then, the actual coordinate calculator 2356 acquires the data of a measurement position from the measurement unit 2330 and stores the data in the storage device such as main memory (FIG. 27: step S111). Then, the projection controller 23512 of the measurement unit controller 2351 controls the projection unit 2301 so as to project slit light onto the object to be measured placed in the measurement volume. The projection unit 2301 projects the slit light onto the object to be measured on the reference plane 2302 according to the instruction from the projection controller 23512. Further, the camera controller 23511 of the measurement unit controller 2351 controls the camera 2304 so as to take an image of the bright and dark pattern of the slit light. The camera 2304 takes the image of the bright and dark pattern of the slit light by the CCD 2342 according to the instruction from the camera controller 23511. The image data taken by the CCD 2342 is temporarily stored in the memory in the camera 2304 and then is outputted to the image processing apparatus 2305. The image processing apparatus 2305 stores the image data in the storage device such as the measured data storage 2358 (step S113). This step is basically the same as step s101.

Next, the actual coordinate calculator 2356 specifies the light receiving coordinates (x, y) on the light receiving plane, for example, on the basis of the image data stored in the measured data storage 2358, and stores them, for example, in the measured data storage 2538 (step S115). This step is the same as step S103. For example, a data table shown in FIG. 28 is provided in the measured data storage 2358 and the light receiving coordinates (x, y) are stored in the data table. An example shown in FIG. 28 includes a column 2701 of the light receiving coordinate number, a column 2702 of x coordinate on the light receiving plane, a column 2703 of y coordinate, a column 2704 of Z coordinate, a column of X coordinate, and a column 2706 of Y coordinate. At this step, only the data of x coordinate and y coordinate are registered.

Then, the actual coordinate calculator 2356 calculates height Z by means of the multi-dimensional Newton method (for example, Jacobian inversion method) for light receiving coordinates (x, y) on the light receiving plane, and stores the height Z, for example, in the data table (FIG. 28) stored in the measured data storage 2358 (step S117). The height Z is calculated by using the data expressing the tensor product type composite surface generated at the step S107. Here, two-dimensional Jacobian inversion method is well known and its detailed description will be omitted.

Next, the actual coordinate calculator 2356 calculates an actual coordinate X by means of the multi-dimensional Newton method (for example, Jacobian inversion method) for the respective light receiving coordinates (x, y) and stores the actual coordinate X, for example, in the data table (FIG. 28) stored in the measured data storage 2358 (step S119). It is possible that Φ in the description related to the step S27 is substituted by Z and that the same processing be performed by using the data of the control points shown in FIG. 18A. Then, the X coordinate in the actual space can be obtained for each tuple of the light receiving coordinates (x, y) and the height Z.

Similarly, the actual coordinate calculator 2356 calculates an actual coordinate Y by means of the multi-dimensional Newton method (for example, Jacobian inversion method) for each tuple of the light receiving coordinates (x, y) and the height Z, and stores the actual coordinate Y, for example, in the data table (FIG. 28) stored in the measured data storage 2358 (step S121). It is possible that Φ in the description related to the step S27 is substituted by Z and that the same processing be performed by using the data of the control points shown in FIG. 18B. Then, the Y coordinate of actual space can be obtained for each tuple of the light receiving coordinates (x, y) and the height Z.

Then, the actual coordinate calculator 2356 compensates the X coordinate and the Y coordinate calculated at the steps S119 and S121 by using the data of position of the measurement unit 2330 acquired at the step S111, and stores the compensated X coordinate and Y coordinate, for example, in the data table (FIG. 28) stored in the measured data storage 2358 (step S123). For example, in a case where the measurement unit 2330 is moved by Δx from a reference position by the moving mechanism, a compensation of (X coordinate value+Δx) is made to the X coordinate value.

Thereafter, it is determined whether or not the processing is performed for all positions of the measurement unit 2330 (step S125). That is, it is determined whether or not the whole measurement portion of the object to be measured is scanned with the slit light. If there remains a position for which the processing is not yet performed, the measurement unit controller 2351 instructs the measurement unit 2330 to change the position of the measurement unit 2330 by one unit and the measurement unit 2330 has its position changed by one unit by the moving mechanism (step S127). Then, the processing returns to the step S111. On the other hand, if it is determined that the processing is performed for all positions, the interpolation processor 2359 performs an interpolation processing (step S129). The outline of the interpolation processing is shown in FIG. 29. In FIG. 29, a circle indicates a point corresponding to one record stored in the data table shown in FIG. 28. The adjacent points are connected to each other to form, for example, a triangle mesh, and a point within this triangle mesh can be determined by interpolating the coordinates (X, Y, Z) of three vertexes of the triangle. As for the determined data, a record for the data is additionally registered, for example, in the data table shown in FIG. 28. However, the step S129 may be skipped.

If the processing described above is performed, the X coordinate value, the Y coordinate value, and the height Z of the object to be measured can be determined. Here, also in the light section method, the simple measurement method of the X coordinate and the Y coordinate like shown in the fringe pattern projection method can be adopted.

In this manner, also in the light section method, absolute value measurement can be performed; hence, the influence of distortion aberration of the lens can be eliminated; the slit light is not necessarily required to be straight; the optical axis is not necessarily required to be aligned; calibration can be automatically performed in the CNC environment; and the degree of flatness and the degree of parallel and CNC accuracy can be enhanced.

Although embodiments of the present invention have been described above, it is not intended to limit the invention to these embodiments. That is, the block diagrams shown in FIG. 4 and FIG. 23 are examples and, in particular, the functional blocks in the image processing apparatuses 5 and 2305 are not necessarily required to correspond to the modules in a program but the program may be divided into the other way. Further, as for the data storage, for example, the storage device of one hard disk may be divided into segments for use. Still further, as for the processing flow, any of steps can be performed at the same time or in altered sequence.

Further, while the use of the tensor product type composite hypersurface or the tensor product type composite surface has been described above, for example, even in the case of using the projective transformation of them, the processing can be performed in the same way.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A measuring apparatus, comprising:
a projector that projects a fringe pattern;
a camera that photographs an image;
a generator that generates, at a time of calibration, from a photographed image of a fringe pattern projected by said projector onto each of a plurality of surfaces with distinct heights $Z_k$, a first set including first tuples, each said first tuple comprising light-receiving-plane-coordinates $(x, y)_{i,j}$ of a light-receiving-point $p_{i,j}$ on a light receiving plane of said camera, light intensity $l_{i,j,k}$ of said light-receiving-point $p_{i,j}$ and the height $Z_k$ of the surface, wherein a number of said light-receiving-points in a longitudinal direction and a number of said light-receiving-points in a lateral direction are common to each of said surfaces; and
a converter that converts, at said time of calibration, said light intensity $L_{i,j,k}$ to a phase angle $\phi_{i,j,k}$ of the projected fringe pattern, and generates a second set including second tuples, to construct a rectangular grid by using each said second tuple as a node, each said second tuple comprising said light-receiving-plane-coordinates $(x, y)_{i,j}$ of said light-receiving-point $p_{i,j}$ on said light receiving plane, said phase angle $\phi_{i,j,k}$ and the height $Z_k$ of the surface.

2. The measuring apparatus as set forth in claim 1, further comprising:

a hyper-surface generator that generates data representing a tensor product type composite hyper-surface from data of said second set, wherein said tensor product type composite hyper-surface is a group of tensor product type patches that are expressed by a linear sum of 3-variable separable-type basis functions whose coefficients are control points comprising a grid structure, and said hyper-surface generator calculates said control points of said tensor product type composite hyper-surface by using said data of said second set as input points.

3. The measuring apparatus as set forth in claim 2, further comprising:
an extractor that extracts, at a time of measurement, data of third tuples, each said third tuple including light-receiving-plane-coordinates $(x,y)$ of a light-receiving-point $p$ on said light receiving plane of said camera and light intensity $I^*$ from a photographed image of a fringe pattern projected by said projector onto an object to be measured;
a second converter that converts, at said time of measurement, said light intensity $I^*$ to a phase angle $\phi^*$ of the projected fringe pattern to generate data of fourth tuples, each said fourth tuple including said light-receiving-plane-coordinates $(x,y)$ of said light-receiving-point $p$ on said light receiving plane and said phase angle $\phi^*$; and
an interpolator that carries out, at said time of measurement, interpolation by using said data representing said tensor product type composite hyper-surface to generate height data Z corresponding to said data of said fourth tuple including said light-receiving-plane-coordinates $(x,y)$ of said light-receiving-point $p$ on said light receiving plane and said phase angle $\phi^*$.

4. The measuring apparatus as set forth in claim 3, further comprising:
a second generator that generates, at said time of calibration, from an image of each of surfaces, which have one height or a plurality of heights $Z^*_k$ and include a plurality of points $P_{i,j}$ whose actual coordinates $(X, Y)_{i,j}$ are designated by an actual stripe or checker pattern, a third set including a plurality of fifth tuples, each said fifth tuple including light-receiving-plane-coordinates $(x^*, y^*)_{i,j}$ of a light-receiving-point $p^*_{i,j}$ on said light receiving plane of said camera, said actual coordinates $(X,Y)_{i,j}$ of said point $P_{i,j}$ on said surface and the height $Z^*_k$ of the surface, wherein said image is photographed at the time of the calibration by said camera without projecting said fringe pattern by said projector.

5. The measuring apparatus as set forth in claim 4, further comprising:
a second hyper-surface generator that generates data representing a second tensor product type composite hyper-surface from data of said third set, wherein said second tensor product type composite hyper-surface is a group of tensor product type patches that are expressed by a linear sum of 3-variable separable-type basis functions whose coefficients are control points comprising a grid structure, and said second hyper-surface generator calculates said control points of said tensor product type composite hyper-surface by using said data of said third set as input points.

6. The measuring apparatus as set forth in claim 4, further comprising:
a surface generator that generates data representing a tensor product type composite surface by using data other than said height data $Z_k$ in data of each said fifth tuple, wherein said tensor product type composite surface is a group of tensor product type patches that are expressed by a linear sum of 2-variable separable-type basis functions whose coefficients are control points comprising a grid structure, and said surface generator calculates said control points of said tensor product type composite surface by using said data of said third set other than said height data, as input points.

7. The measuring apparatus as set forth in claim 4, wherein said actual stripe pattern is either one of a first actual stripe pattern parallel to an X axis on said surface, a second actual stripe pattern parallel to a Y axis on said surface, and a combination of said first and second actual stripe patterns.

8. The measuring apparatus as set forth in claim 5, further comprising:
a second interpolator that carries out, at said time of measurement, interpolation to generate data of actual coordinates (X, Y) corresponding to data of a tuple including said height data Z generated by said interpolator and the corresponding light-receiving-plane-coordinates (x, y) by using said data representing said second tensor product type composite hyper-surface.

9. The measuring apparatus as set forth in claim 6, further comprising:
a third interpolator that carries out, at said time of measurement, interpolation to generate data of actual coordinates (X, Y) before compensation, which corresponds to data of the corresponding light-receiving-plane-coordinates (x, y) on said light receiving plane, by using said data representing said tensor product type composite surface; and
a compensator that compensates said actual coordinates (X, Y) before compensation based on said height data Z generated by said interpolator and data of a predetermined height $Z_0$ of a reference surface at the time of the calibration.

10. A computer numerical control apparatus, comprising:
the measuring apparatus as set forth in claim 1; and
a controller that moves, at said time of calibration, said surface to each said distinct height $Z_k$.

11. A measuring apparatus, comprising:
a projector that projects slit light;
a camera that photographs an image; and
a generator that generates, at a time of calibration, from a photographed image of a said slit light projected by said projector onto each of a plurality of surfaces with distinct heights $Z_k$, a first set of first tuples, each said first tuple including light-receiving-plane-coordinates $(x, y)_i$ of a light-receiving-point $p_i$ on a light receiving plane of said camera and height $Z_k$ of the surface, wherein said light-receiving-point $p_i$ is a point on said light receiving plane, which corresponds to a representative point in a portion onto which said slit light is projected.

12. The measuring apparatus as set forth in claim 11, further comprising:
a surface generator that generates data representing a tensor product type composite surface from data of said first set, wherein said tensor product type composite surface is a group of tensor product type patches that are expressed by a linear sum of 2-variable separable-type basis functions whose coefficients are control points comprising a grid structure, and said surface generator calculates said control points of said tensor product type composite surface by using said data of said first set as input points.

13. The measuring apparatus as set forth in claim 12, further comprising:

an extractor that extracts, at a time of measurement, from a photographed image of said slit light projected by said projector onto an object to be measured, data of light-receiving-plane-coordinates (x*, y*) of a light-receiving-point p* on said light receiving plane of said camera, wherein said light-receiving-point p* is a point on said light receiving plane, which corresponds to a representative point in a portion onto which said slit light is projected; and
an interpolator that carries out, at said time of measurement, interpolation to generate height data Z corresponding to said data of said light-receiving-plane-coordinates (x*, y*) of said light-receiving-point p* on said light receiving plane.

14. The measuring apparatus as set forth in claim 13, further comprising:
a second generator that generates, at said time of calibration, from an image of each of one of a plurality of surfaces with distinct heights $Z^*_k$, including a plurality of points $P_{i,j}$ whose actual coordinates $(X, Y)_{i,j}$ are designated by an actual stripe or checker pattern, a second set of second tuples, each said second tuple including said light-receiving-plane-coordinates (x*, y*) of a light-receiving-point $p^*_{i,j}$ on said light receiving plane of said camera, said actual coordinates $(X, Y)_{i,j}$ of the point on said surface, and the height $Z^*_k$ of the surface, wherein said image is photographed by said camera without projecting said slit light by said projector.

15. The measuring apparatus as set forth in claim 14, further comprising:
a hyper-surface generator that generates data representing a tensor product type composite hyper-surface from data of the second set, wherein said tensor product type composite hyper-surface is a group of tensor product type patches that are expressed by a linear sum of 3-variable separable-type basis functions whose coefficients are control points comprising a grid structure, and said hyper-surface generator calculates said control points of said tensor product type composite hyper-surface by using said data of said second set as input points.

16. The measuring apparatus as set forth in claim 15, further comprising:
a second interpolator that carries out, at said time of measurement, interpolation to generate data of first actual coordinates (X*, Y*) corresponding to data of a tuple including said height data Z generated by said interpolator and light-receiving-plane-coordinates (x*, Y*) of the corresponding light-receiving-point p* on said light receiving plane by using said data representing said tensor product type composite hyper-surface; and
a compensator that compensates data of said first actual coordinates (X*, Y*) according to positions of said projector and said camera in an actual coordinate system.

17. The measuring apparatus as set forth in claim 16, further comprising:
a third interpolator that carries out, at said time of measurement, interpolation to generate data of coordinates (X*, Y*) of a point, which are not measured, by using the compensation result and the corresponding height data Z.

18. A computer numerical control apparatus, comprising:
the measuring apparatus as set forth in claim 11; and
a controller that moves, at said time of calibration, said surface to each said distinct height $Z_k$.

19. A measuring apparatus, further comprising:
a projector that projects a fringe pattern;
a camera that photographs an image;

a generator that generates, at a time of calibration, from a photographed image of a fringe pattern projected by said projector onto each of a plurality of surfaces with distinct heights $Z_k$, a first set including first tuples, each said first tuple including light-receiving-plane-coordinates $(x, y)_{i,j}$ of a light-receiving-point $p_{i,j}$ on a light receiving plane of said camera, to be a node of a graph structure common to each of said surfaces, light intensity $l_{i,j,k}$ of said light-receiving-point $p_{i,j}$, and height $Z_k$ of said surface; and a converter that converts, at said time of calibration, said light intensity $l_{i,j,k}$ to a phase angle $\phi_{i,j,k}$ of the projected fringe pattern to generate a second set of second tuples for constructing a grid by using each said second tuple as a node, each said second tuple including said light-receiving-plane-coordinates $(x, y)_{i,j}$ of said light-receiving-point $p_{i,j}$ on said light receiving plane, said phase angle $\phi_{i,j,k}$, and the height $Z_k$ of the surface.

20. The measuring apparatus as set forth in claim 19, further comprising:

a hyper-surface generator that generates data representing a composite hyper-surface from data of said second set, wherein said composite hyper-surface is a group of catches that are expressed by a linear sum of 3-variable separable-type basis functions whose coefficients are control points comprising a grid structure, and said hyper-surface generator calculates said control points of said composite hyper-surface by using said data of said second set as input points.

21. The measuring apparatus as set forth in claim 20, further comprising:

an extractor that extracts, at a time of measurement, from an image of a fringe pattern projected by said projector onto an object to be measured, a third set of third tuples, each said third tuple including said light-receiving-plane-coordinates $(x, y)$ of a light-receiving-point $p$ on said light receiving plane of said camera and light intensity $I^*$ of said light-receiving-point $p$;

a converter that converts, at said time of measurement, said light intensity $I^*$ to a phase angle $\phi^*$ in the projected fringe pattern to generate data of fourth tuples, each said fourth tuple including said light-receiving-plane-coordinates $(x, y)$ of said light-receiving-point $p$ on said light receiving plane and said phase angle $\phi^*$; and an interpolator that carries out, at said time of measurement, interpolation to generate height data $Z$ corresponding to data of said fourth tuple including said light-receiving-plane-coordinates $(x, y)$ of said light-receiving-point $p$ on said light receiving plane and said phase angle $\phi^*$ by using said data representing said composite hyper-surface.

22. A computer numerical control apparatus, comprising:
the measuring apparatus as set forth in claim 19; and
a controller that moves, at said time of calibration, said surface to each said distinct height $Z_k$.

23. A computer-readable storage medium storing a program executed by a measuring apparatus comprising a projector and a camera, said program comprising:

generating, at a time of calibration, from a photographed image of a fringe pattern projected by said projector onto each of a plurality of surfaces with distinct heights $Z_k$, a first set including first tuples, each said first tuple comprising light-receiving-plane-coordinates $(x, y)_{i,j}$ of a light-receiving-point $p_{i,j}$ on a light receiving plane of said camera, light intensity $l_{i,j,k}$ of said light-receiving-point $p_{i,j}$ and the height $Z_k$ of the surface, wherein a number of said light-receiving-points in a longitudinal direction and a number of said light-receiving-points in a lateral direction are common to each of said surfaces; and converting, at said time of calibration, said light intensity $l_{i,j,k}$ to a phase angle $\phi_{i,j,k}$ of the projected fringe pattern, and generating a second set including second tuples, for constructing a rectangular grid by using each said second tuple as a node, each said second tuple comprising said light-receiving-plane-coordinates $(x, y)_{i,j}$ of said light-receiving-point $p_{i,j}$ on said light receiving plane, said phase angle $\phi_{i,j,k}$ and the height $Z_k$ of the surface.

24. The computer-readable storage medium as set forth in claim 23, said program further comprising:

generating data representing a tensor product type composite hyper-surface from data of said second set, wherein said tensor product type composite hyper-surface is a group of tensor product type patches that are expressed by a linear sum of 3-variable separable-type basis functions whose coefficients are control points comprising a grid structure, and said generating said data representing said tensor product type composite hyper-surface comprises calculating said control points of said tensor product type composite hyper-surface by using said data of said second set as input points.

25. The computer-readable storage medium as set forth in claim 24, said program further comprising:

extracting, at a time of measurement, data of third tuples, each said third tuple including light-receiving-plane-coordinates $(x, y)$ of a light-receiving-point $p$ on said light receiving plane of said camera and light intensity $I^*$ from a photographed image of a fringe pattern projected by said projector onto an object to be measured;

converting, at said time of measurement, said light intensity $I^*$ to a phase angle $\phi^*$ of the projected fringe pattern to generate data of fourth tuples, each said fourth tuple including said light-receiving-plane-coordinates $(x, y)$ of said light-receiving-point $p$ on said light receiving plane and said phase angle $\phi^*$; and carrying out, at said time of measurement, interpolation by using said data representing said tensor product type composite hyper-surface to generate height data $Z$ corresponding to said data of said fourth tuple including said light-receiving-plane-coordinates $(x, y)$ of said light-receiving-point $p$ on said light receiving plane and said phase angle $\phi^*$.

26. The computer-readable storage medium as set forth in claim 25, said program further comprising:

generating, at said time of calibration, from an image of each of one or a plurality of surfaces with distinct heights $Z_k$, including a plurality of points $P_{i,j}$ whose actual coordinates $(X, Y)_{i,j}$ are designated by an actual stripe or checker pattern, a third set including a plurality of fifth tuples, each said fifth tuple including light-receiving-plane-coordinates $(x^*, y^*)$ of a light-receiving-point $p^*$ on said light receiving plane of said camera, said actual coordinates $(X, Y)_{i,j}$ of said point $P_{i,j}$ on said surface and the height $Z_k$ of the surface, wherein said image is photographed at the time of the calibration by said camera without projecting said fringe pattern by said projector.

27. The computer-readable storage medium as set forth in claim 26, said program further comprising:

generating data representing a second tensor product type composite hyper-surface from data of said third set, wherein said second tensor product type composite hyper-surface is a group of tensor product type patches that are expressed by a linear sum of 3-variable separable-type basis functions whose coefficients are control points comprising a grid structure, and said generating said data representing said second tensor product type composite hyper-surface comprises calculating said control points of said tensor product type composite hyper-surface by using said data of said third set as input points.

28. The computer-readable storage medium as set forth in claim 27, said program further comprising: carrying out, at said time of measurement, interpolation to generate data of actual coordinates (X, Y) corresponding to data of a tuple including said height data Z generated by said interpolator and the corresponding light-receiving-plane-coordinates (x, y) on said light receiving plane by using said data representing said second tensor product type composite hyper-surface.

29. A computer-readable storage medium storing a program executed by a measuring apparatus including a projector and a camera, said program comprising:

generating, at a time of calibration, from a photographed image of a slit light projected by said projector onto each of a plurality of surfaces with distinct heights $Z_k$, a first set of first tuples, each said first tuple including light-receiving-plane-coordinates $(x, y)_i$ of a light-receiving-point $p_i$ on a light receiving plane of said camera and height $Z_k$ of the surface, wherein said light-receiving-point $p_i$, is a point on said light receiving plane, which corresponds to a representative point in a portion onto which said slit light is projected; and generating data representing a tensor product type composite surface from data of said first set, wherein said tensor product type composite surface is a group of tensor product type patches that are expressed by a linear sum of 2-variable separable-type basis functions whose coefficients are control points comprising a grid structure, and said generating said data representing said tensor product type composite surface comprises calculating said control points of said tensor product type composite surface by using said data of said first set as input points.

30. A computer-readable storage medium storing a program executed by a measuring apparatus including a projector and a camera, said program comprising:

generating, at a time of calibration, from a photographed image of a fringe pattern projected by said projector onto each of a plurality of surfaces with distinct heights $Z_k$, a first set including first tuples, each said first tuple including light-receiving-plane-coordinates $(x, y)_{i,j}$ of a light-receiving-point $p_{i,j}$ on a light receiving plane of said camera, to be a node of a graph structure common to each of said surfaces, light intensity $l_{i,j,k}$ of said light-receiving-point, and height $Z_k$ of said surface; and converting, at said time of calibration, said light intensity $l_{i,j,k}$ to a phase angle $\phi_{i,j,k}$ of the projected fringe pattern to generate a second set of second tuples for constructing a grid by using each said second tuple as a node, each said second tuple including light-receiving-plane-coordinates $(x, y)_{i,j}$ of said light-receiving-point $p_{i,j}$ on said light receiving plane, said phase angle $\phi_{i,j,k}$, and the height $Z_k$ of the surface.

* * * * *

UNITED STATES PATENT AND TRADEMARK OFFICE
CERTIFICATE OF CORRECTION

PATENT NO. : 7,502,125 B2
APPLICATION NO. : 10/923856
DATED : March 10, 2009
INVENTOR(S) : Tatsuhiko Suzuki It is certified that error appears in the above-identified patent and that said Letters Patent is hereby corrected as shown below:

Column 31, Line 51, change "$1_{i,j,k}$" to --$I_{i,j,k}$--.

Column 31, Line 58, change "$L_{i,j,k}$" to --$I_{i,j,k}$--.

Column 33, Line 44, before "said" delete "a".

Column 34, Line 23, before "light-receiving-plane" delete "said".

Column 34, Line 23, change "(x*, y*)" to --$(x^*, y^*)_{i,j}$--.

Column 34, Line 47, change "(x*, Y*)" to --(x*, y*)--.

Column 35, Line 8, change "$1_{i,j,k}$" to --$I_{i,j,k}$--.

Column 35, Line 12, change "$1_{i,j,k}$" to --$I_{i,j,k}$--.

Column 35, Line 24, change "catches" to --patches--.

Column 35, Line 35, after "including" delete "said".

Column 35, Line 65, change "$1_{i,j,k}$" to --$I_{i,j,k}$--.

Column 36, Line 5, change "$l_{i,j,k}$" to --$I_{i,j,k}$--.

Column 37, Line 25, change "$p_i$," to --$p_i$--.

Column 38, Line 19, change "$1_{i,j,k}$" to --$I_{i,j,k}$--.

UNITED STATES PATENT AND TRADEMARK OFFICE
CERTIFICATE OF CORRECTION

PATENT NO. : 7,502,125 B2
APPLICATION NO. : 10/923856
DATED : March 10, 2009
INVENTOR(S) : Tatsuhiko Suzuki It is certified that error appears in the above-identified patent and that said Letters Patent is hereby corrected as shown below:

Column 38, Line 22, change "$1_{i,j,k}$" to --$I_{i,j,k}$--.

Signed and Sealed this

Sixteenth Day of June, 2009

JOHN DOLL
*Acting Director of the United States Patent and Trademark Office*